(12) United States Patent
Liao et al.

(10) Patent No.: US 10,554,161 B2
(45) Date of Patent: *Feb. 4, 2020

(54) OFF-GRID POWER GENERATING APPARATUS FOR PROVIDING DUAL OUTPUT VOLTAGE

(71) Applicant: Chongqing HEYA Technology Co., Ltd., Chongqing (CN)

(72) Inventors: Yong Liao, Chongqing (CN); Huaping Tang, Chongqing (CN); Weijia Zhang, Chongqing (CN); Meichang Xie, Chongqing (CN)

(73) Assignee: CHONGQING HEYA TECHNOLOGY CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,797

(22) Filed: Jun. 7, 2018

(65) Prior Publication Data
US 2019/0229657 A1    Jul. 25, 2019

(30) Foreign Application Priority Data

Jan. 25, 2018 (CN) .......................... 2018 1 0073786

(51) Int. Cl.
*H02P 7/00* (2016.01)
*H02P 9/30* (2006.01)
(Continued)

(52) U.S. Cl.
CPC ............... *H02P 9/307* (2013.01); *H02J 3/14* (2013.01); *H02J 9/066* (2013.01); *H02K 1/12* (2013.01);
(Continued)

(58) Field of Classification Search
CPC .. H02P 9/44; H02P 9/008; H02P 9/305; H02J 3/14; H02J 9/066; H02K 1/12; H02K 1/22; H02K 3/28
(Continued)

(56) References Cited

U.S. PATENT DOCUMENTS

| 4,994,684 A | * | 2/1991 | Lauw | ........................ H02P 9/42 |
| | | | | 290/40 C |
| 2004/0021437 A1 | * | 2/2004 | Maslov | ..................... B60L 8/00 |
| | | | | 318/400.01 |

(Continued)

*Primary Examiner* — Eduardo Colon Santana
*Assistant Examiner* — Gabriel Agared
(74) *Attorney, Agent, or Firm* — Hamre, Schumann, Mueller & Larson, P.C.

(57) ABSTRACT

An off-grid power generating apparatus is provided. The apparatus includes an engine, an alternator and an excitation control device. The alternator includes a rotor, a switch and a stator. The switch is movable between a first position and a second position. An output portion of the stator has first and second segments each of which has at least one coil. The first and second segments are operatively and separately connected with the switch. The first and second segments are connected in series at the first position and in parallel at the second position to provide a high voltage and a low voltage respectively. The excitation control device controls the output voltage to make it have a predetermined frequency, and to regulate the engine speed in response to the load power of the engine.

14 Claims, 22 Drawing Sheets

(51) Int. Cl.
*H02P 9/44* (2006.01)
*H02P 9/00* (2006.01)
*H02J 9/06* (2006.01)
*H02K 3/12* (2006.01)
*H02K 1/12* (2006.01)
*H02K 1/22* (2006.01)
*H02J 3/14* (2006.01)
*H02K 3/28* (2006.01)
*H02P 25/16* (2006.01)
*H02P 21/22* (2016.01)
*H02P 103/10* (2016.01)

(52) U.S. Cl.
CPC .................. *H02K 1/22* (2013.01); *H02K 3/12* (2013.01); *H02K 3/28* (2013.01); *H02P 9/008* (2013.01); *H02P 9/305* (2013.01); *H02P 9/44* (2013.01); *H02P 21/22* (2016.02); *H02P 25/16* (2013.01); *H02J 2003/143* (2013.01); *H02P 2103/10* (2015.01)

(58) Field of Classification Search
USPC ......................................................... 318/158
See application file for complete search history.

(56) References Cited

U.S. PATENT DOCUMENTS

| | | | |
|---|---|---|---|
| 2005/0162106 A1* | 7/2005 | Cho | B60K 6/46 318/139 |
| 2008/0238108 A1* | 10/2008 | Edelson | B60W 10/06 290/400 |
| 2009/0236860 A1* | 9/2009 | Raasch | F02D 29/06 290/40 B |
| 2009/0295169 A1* | 12/2009 | Usselman | F02B 63/04 290/1 A |
| 2015/0180367 A1* | 6/2015 | Tesch | H02P 9/009 363/95 |

* cited by examiner

OFF-GRID POWER GENERATING APPARATUS FOR PROVIDING DUAL OUTPUT VOLTAGE

CROSS-REFERENCE TO RELATED APPLICATION

This application claims priority to Chinese Patent Application No. 201810073786.8, entitled "Off-Grid Power Generating Apparatus for Providing Dual Output Voltage and Portable Generator Set" filed on Jan. 25, 2018, which is incorporated by reference in its entirety.

FIELD OF TECHNOLOGY

Embodiments disclosed herein relate generally to an electrical power generating apparatus and a portable generator set, and in particular, to an engine-driven and off-grid power generating apparatus and a portable generator set with variable speed and constant frequency.

BACKGROUND

An off-grid generator set is a power generating system whose connection to an electrical power grid is temporarily or permanently unavailable. Off-grid generator sets have been widely used. For example, a portable/standby generator set may be utilized to power electrical equipment connected via a circuit with the generator set when people do camping, tailgating and working outside. A similar power generating apparatus is also utilized to provide backup power in emergencies, for example during blackout.

The off-grid generator set usually utilizes a driving engine coupled to a generator (or alternator) through a common shaft. Upon actuation of the engine, the engine rotates the common shaft to drive the alternator that, in turn, generates electrical power. Most residential electric equipment is designed to be used in connection with electrical power having a fixed frequency, for example, 60 hertz (Hz) in North America and 50 Hz in China. The frequency of the output electrical power is primarily determined by the operating speed of the engine. As a result, the engine's operating speed of some generator sets is fixed to keep the frequency of the output electrical power fixed. However, when an electrical load applied to the generator set is less than the rated kilowatt load for which the generator set is designed, the engine's fuel-efficiency deteriorates.

Additionally, an off-grid generator set usually generates an output voltage at a certain level since most electrical loads are designed to work with a voltage at such level. For example, some household appliances uses a voltage of 120 volts and others uses a voltage of 240 volts.

SUMMARY

The inventors have contemplated to employ converters. e.g., AC-DC-AC converters, to modulate voltage levels to meet the needs in North America and other countries. However, the cost of this solution is high since converters account for 20-60% of the overall cost of the generator set. The inventors make use of the fact that the cost of windings is much lower than that of converters and therefore invent an off-grid generator set that greatly saves cost but achieves similar or better results of using AC-DC-AC converters. The single phase winding of the generator set has a plurality of segments that are separately connected with a switch. The switch is movable between a first position and a second position by a user. The segments of the single phase winding are in series connection at the first position of the switch to provide a high voltage to the electrical load, and the segments are in parallel connection at the second position of the switch to provide a low voltage to the electrical load. In this manner, the generator set provides an output voltage at dual levels.

Embodiments of off-grid power generating apparatus for providing a dual-level output voltage are described. In accordance with some embodiments, the power generating apparatus includes an alternator that has a stator with one single phase winding and a rotor with a plurality of symmetric phase windings. The off-grid power generating apparatus is a power generating system whose connection to an electrical power grid is temporarily or permanently unavailable. A single phase winding of the stator refers to that the coil of the stator has only one axial direction. The single phase winding of the stator may include a plurality of coils but the axial direction of the plurality of coils should coincide. Symmetric phase windings are windings configured to form a rotating magnetic field that is an air gap magnetic field of a motor with a constant magnitude. The plurality of symmetric phase windings may have two or more phases.

The off-grid power generating apparatus includes an engine, an alternator and an excitation control device in accordance with some embodiments. The alternator includes a rotor, a switch, a stator and one or more sensors. The rotor is coaxially coupled to the engine and includes a plurality of symmetric phase windings. The switch is operatively connected with the electrical load, and is movable between a first position and a second position by a user. The stator has a single phase winding that includes an output portion. The output portion has a first segment and a second segment each of which has at least one coil configured to generate an induced voltage. The first segment and the second segment are operatively and separately connected with the switch. The first segment and the second segment are configured to be connected in series at the first position of the switch to provide a high voltage to the electrical load via the switch, and connected in parallel at the second position of the switch to provide a low voltage to the electrical load via the switch. The one or more sensors is configured to measure the operation data of the apparatus. The excitation control device is operatively connected with the engine and the alternator, and is configured to control the induced voltage generated in the single phase winding of the stator to make the induced voltage have a predetermined frequency by regulating the rotating magnetic field generated in the phase windings of the rotor. The excitation control device is also configured to calculate load power of the load in accordance with at least the operation data measured by the one or more sensors, and regulate the speed of the engine in response to the calculated load power.

In accordance with some embodiments, the apparatus is set to operate at a speed equal to or less than a synchronous speed of the alternator. The synchronous speed of the alternator refers to the rotation rate of the stator's magnetic field.

The alternator also includes a frequency conversion device operatively connected with the single phase winding of the stator in accordance with some embodiments. The frequency conversion device is operatively connected with the phase windings of the rotor to supply an excitation voltage to the phase windings of the rotor for establishing the rotating magnetic field.

In accordance with some embodiments, either of the first segment and the second segment is configured to be operatively connected with the frequency conversion device and applies the excitation voltage to the phase windings of the rotor via the frequency conversion device.

The single phase winding of the stator includes an excitation portion in accordance with some embodiments. The excitation portion has at least one coil, and is connected with the frequency conversion device to apply the excitation voltage to the phase windings of the rotor via the frequency conversion device.

The frequency conversion device further includes a direct current bus voltage regulator and an inverter in accordance with some embodiments. The direct current bus voltage regulator is operatively connected with the single phase winding of the stator, and is configured to receive and rectify the excitation voltage from the single phase winding of the stator and output a rectified direct current bus voltage. The inverter is operatively connected with the direct current bus voltage regulator, and is configured to receive the rectified direct current voltage and supply the excitation voltage to the plurality of symmetric phase windings of the rotor for establishing the rotating magnetic field.

In accordance with some embodiments, the alternator further includes an electrical circuit. The circuit connects the single phase winding of the stator and the electrical load and is configured in a way that the induced voltage generated in the single phase winding of the stator and the output voltage provided to the electrical load are at the same frequency.

In accordance with some embodiments, the alternator further includes a signal transmitter between the switch and the excitation control device for transmitting a signal indicating the voltage mode of the switch, i.e., whether the switch is in a high voltage mode or a low voltage mode to the excitation control device.

In accordance with some embodiments, either of the first segment and the second segment is connected with the electrical load via the switch for providing to the electrical load the low voltage when the first segment and the second segment are connected in series at the first position of the switch to provide the high voltage to the electrical load via the switch.

An off-grid portable generator set is provided in accordance with some embodiments. The generator set includes an engine, an induction asynchronous alternator and an excitation control device. The induction asynchronous alternator includes a rotor, a switch, a stator and one or more sensors. The rotor is coaxially coupled to the engine and includes a plurality of symmetric phase windings. The switch is operatively connected with the electrical load, and is movable between a first position and a second position by a user. The stator has a single phase winding that includes an output portion. The output portion has a first segment and a second segment each of which has at least one coil configured to generate an induced voltage. The first segment and the second segment are operatively and separately connected with the switch. The dual-level output voltage includes a high voltage and a low voltage. The first segment and the second segment are configured to be connected in series at the first position of the switch to provide the high voltage to the electrical load via the switch, and connected in parallel at the second position of the switch to provide the low voltage to the electrical load via the switch. The one or more sensors is configured to measure the operation data of the apparatus. The excitation control device is operatively connected with the engine and the alternator, and is configured to control the induced voltage generated in the single phase winding of the stator to make the induced voltage have a predetermined frequency by regulating the rotating magnetic field generated in the phase windings of the rotor. The excitation control device is also configured to calculate load power of the load in accordance with at least the operation data measured by the one or more sensors, and regulate speed of the engine in response to the calculated load power.

The off-grid power generating apparatus and the portable generator set (the portable generator set will not be mentioned below for the sake of briefness) with a stator having a single phase winding and a rotor with a plurality of symmetric windings generate a dual-level output voltage by using a plurality of coils in the single phase winding of the stator that are separately connected with a switch. In this manner, the cost of the apparatus is tremendously reduced.

DETAILED DESCRIPTION

References are made to the accompanying drawings that form a part hereof, and in which is shown by way of illustration of the embodiments in which the embodiments may be practiced. Similar reference numbers indicate similar parts in all diagrams.

Figure 1:
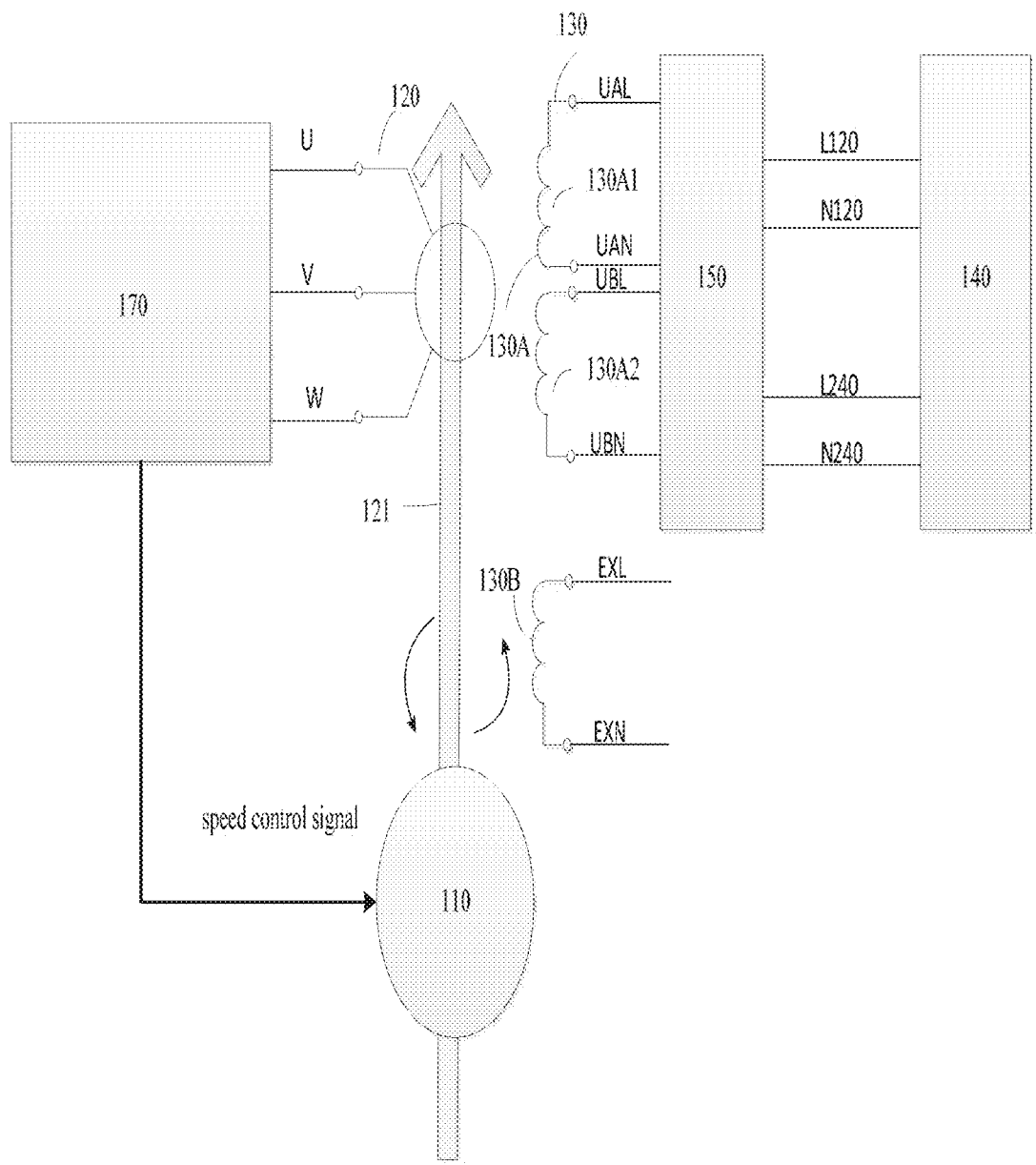
FIG. 1 is a schematic diagram of an off-grid power generating apparatus for providing an output voltage at dual levels to an electrical load in accordance with some embodiments.

FIG. 1 is a schematic diagram of an off-grid power generating apparatus for providing an output voltage at dual levels to an electrical load in accordance with some embodiments.

An electrical load 140 may be an electrical appliance, e.g., an oven or an audio player that people use while doing camping and electrical appliances used during blackout. The off-grid apparatus includes an engine 110, an alternator and excitation control device 170. The engine 110 may receive fuel such as gasoline, diesel, natural gas, or liquid propane vapor through an intake. The fuel provided to the engine 110 is compressed and ignited to generate reciprocating motion of pistons of the engine 110. The reciprocating motion of the piston of the engine 110 is converted to rotary motion by a crankshaft of the engine 110, which is operatively coupled to the alternator. The alternator may be an induction alternator with a variable speed and constant frequency. The alternator specifically includes a rotor 120, a stator 130, a switch 150 and one or more sensors (not shown in FIG. 1). The rotor 120 may be a cylindrical rotor having a plurality of symmetric phase windings. It is received within the stator 130 and coaxially coupled with the crankshaft of the engine 110 through a common shaft 121. As the engine 110 rotates, the common shaft 121 drives the rotor 120 to rotate and a rotating magnetic field is established in the symmetric phase windings of the rotor 120. The excitation control device 170 controls and monitors the alternator and the engine 110, which will be described with more details below.

The stator 130 has a single phase winding that includes an output portion 130A in accordance with some embodiments. A single phase voltage is induced in the single phase winding in response to the rotation of the magnetic field established in the plurality of symmetric phase windings of the rotor 120. The output portion 130A includes a first segment 130A1 and a second segment 130A2 as illustrated in FIG. 1. The first segment 130A1 includes one coil with a first terminal line UAL, which may be a live line, and a second terminal line UAN, which may be a neutral line. The second segment 130A2 may include another coil with a third terminal line UBL and a fourth terminal line UBN, which are a live line and a neutral line respectively. The first segment 130A1 and the second segment 130A2 may separately include a plurality of coils in series in accordance with some embodiments. The terminal lines UAL, UAN, UBL and UBN of the first segment 130A1 and the second segment 130A2 are separately connected to the switch 150, which, in turn, is connected with the electrical load 140. A user may switch over the switch 150 to selectively connect the first segment 130A1 and the second segment 130A2 in parallel or in series. In this manner, an output voltage at dual levels, for example, 120 volts or 240 volts, which are the most commonly used nominal voltages in North America, may be generated and delivered from the output portion 130A to the load via the switch 150.

The excitation control device 170 modulates the frequency of the induced voltage so that the frequency remains at a predetermined range, for example, 60 hertz (Hz) in North America and 50 Hz in China. Accordingly, the induced voltage is applicable to most household electrical appliances and other electric equipment, which are designed with a fixed frequency.

In accordance with some embodiments, the electrical circuit connects the stator 130 and the electrical load 140 may include switch 150 illustrated in FIG. 1, a plug and two sockets for a user to manually switch between different output voltages, an auto transfer system for automatically switch between different output voltages, or a circuit breaker that breaks the circuit when it is overpowered, etc. However, the electrical circuit herein does not include a frequency conversion device such as a converter and an inverter that changes the frequency of the voltage. In other words, the electrical circuit is configured in a way that the induced voltage generated in the single phase winding and the output voltage applied to the load are at the same frequency.

Figure 2A:
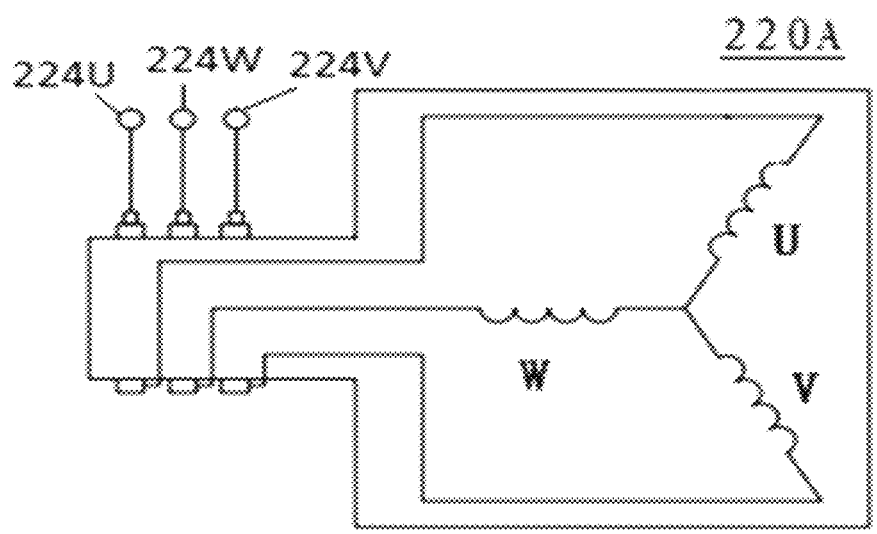
FIG. 2A illustrates an arrangement of the rotor in accordance with some embodiments.
Figure 2B:
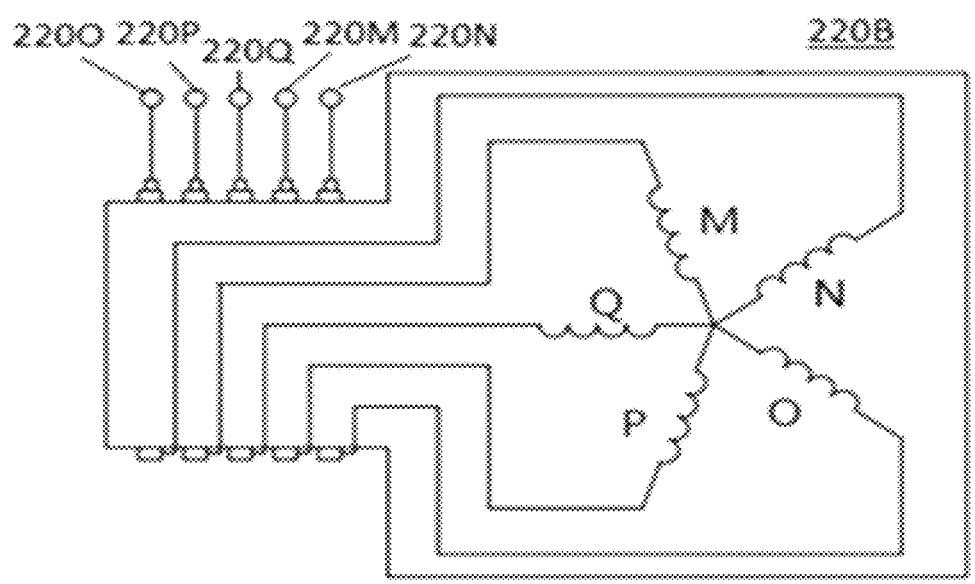
FIG. 2B illustrates another arrangement of the rotor in accordance with some embodiments.
Figure 2C:
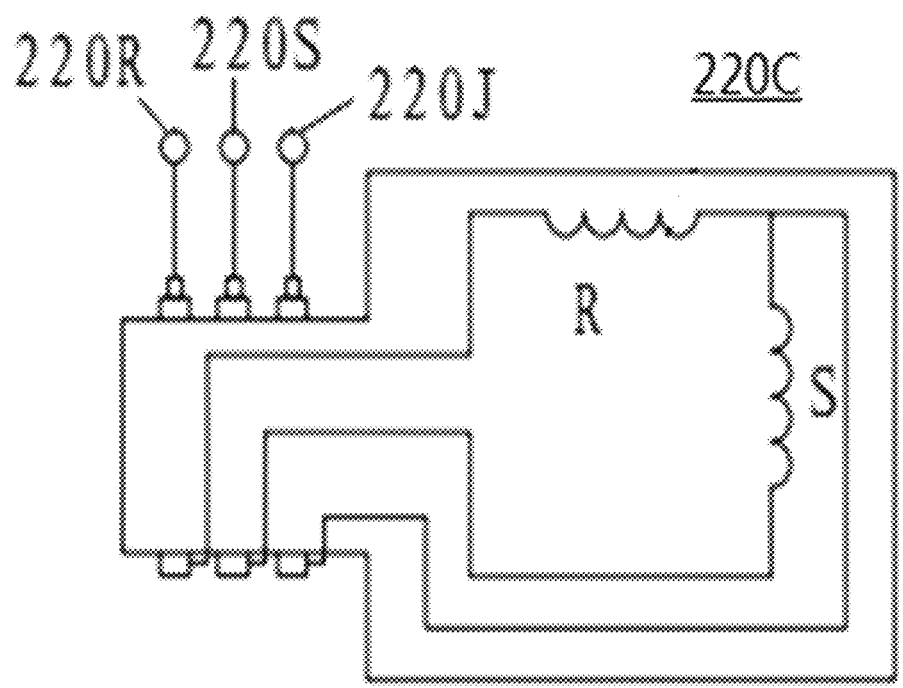
FIG. 2C illustrates another arrangement of the rotor in accordance with some embodiments.

The rotor 120 may include a plurality of symmetric phase windings. FIG. 2A illustrates an arrangement of the rotor 220A in accordance with some embodiments. The rotor 220A has three phase windings U, V and W in a star connection. The axes of the three phase windings U, V and W are spatially separated at an angular degree of 120°. Each of the three phase windings U, V and W may include one coil with an equal number of coil turns. Terminal of the coils may be connected via binding posts 224U, 224V and 224W. Other symmetric configurations of three phase windings such as a delta connection are also applicable to the power generating apparatus. FIG. 2B illustrates another arrangement of the rotor in accordance with some embodiments. The rotor 220B includes five phase windings M, N, O, P and Q arranged in a symmetric manner, i.e., the axes of the five phase windings M, N, O, P and Q are spatially separated at an angular degree of 72°. Each of the five phase windings M, N, O, P and Q may include one coil with an equal number of coil turns. Terminal of the coils may be connected via binding posts 220O, 220P, 220Q, 220M and 220N. FIG. 2C illustrates another arrangement of the rotor 220C in accordance with some embodiments. Two symmetric phase windings R and S that are separate spatially at an angular degree of 90° are provided. Each of the two phase windings R and S may include one coil with an equal number of coil turns. Terminals of the coils may be connected via binding posts 220R, 220S and 220J.

Figure 3A:
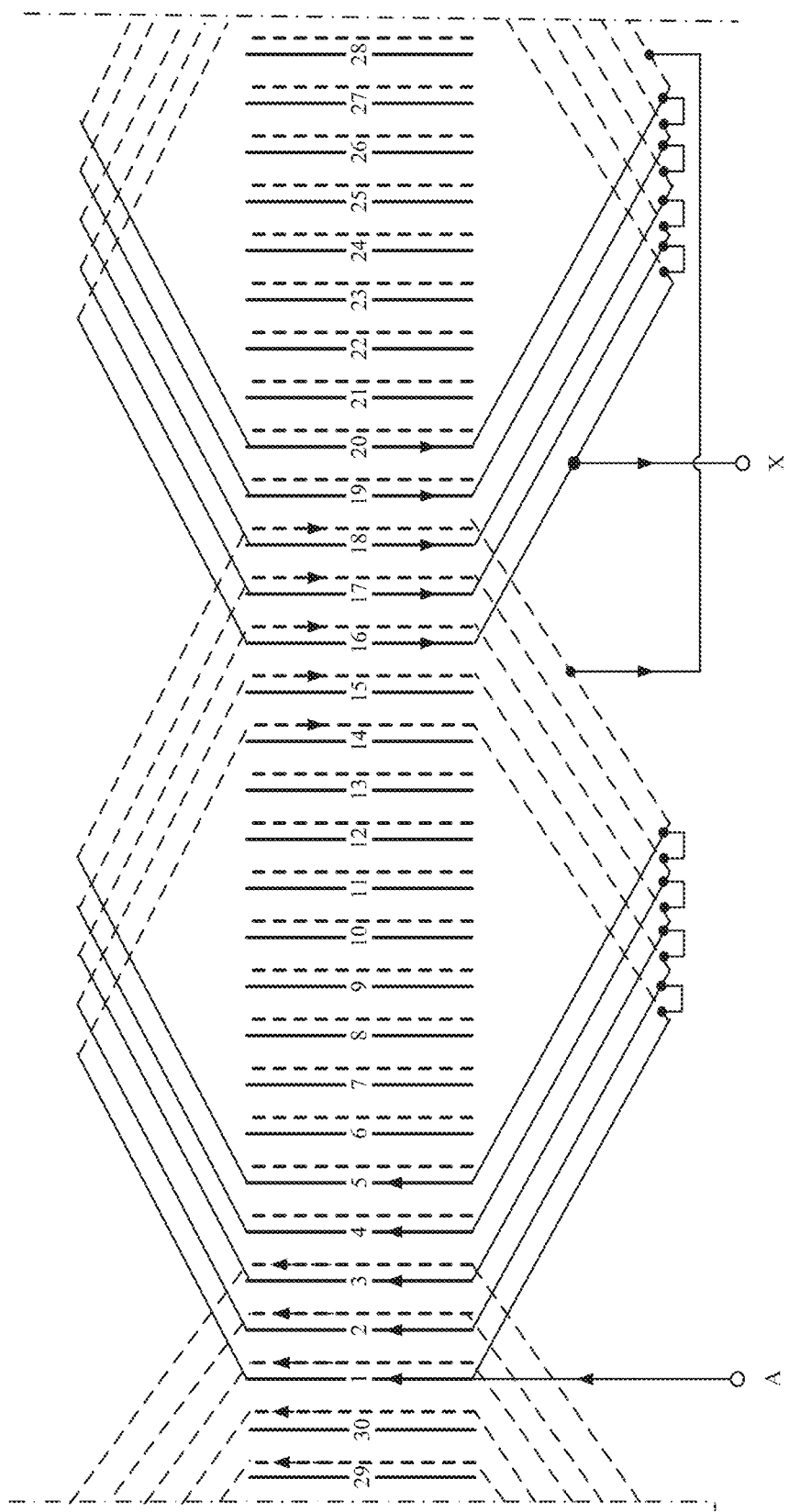
FIGS. 3A-3C are expanded views that respectively show the three phase windings of the rotor in accordance with some embodiments.
Figure 3B:
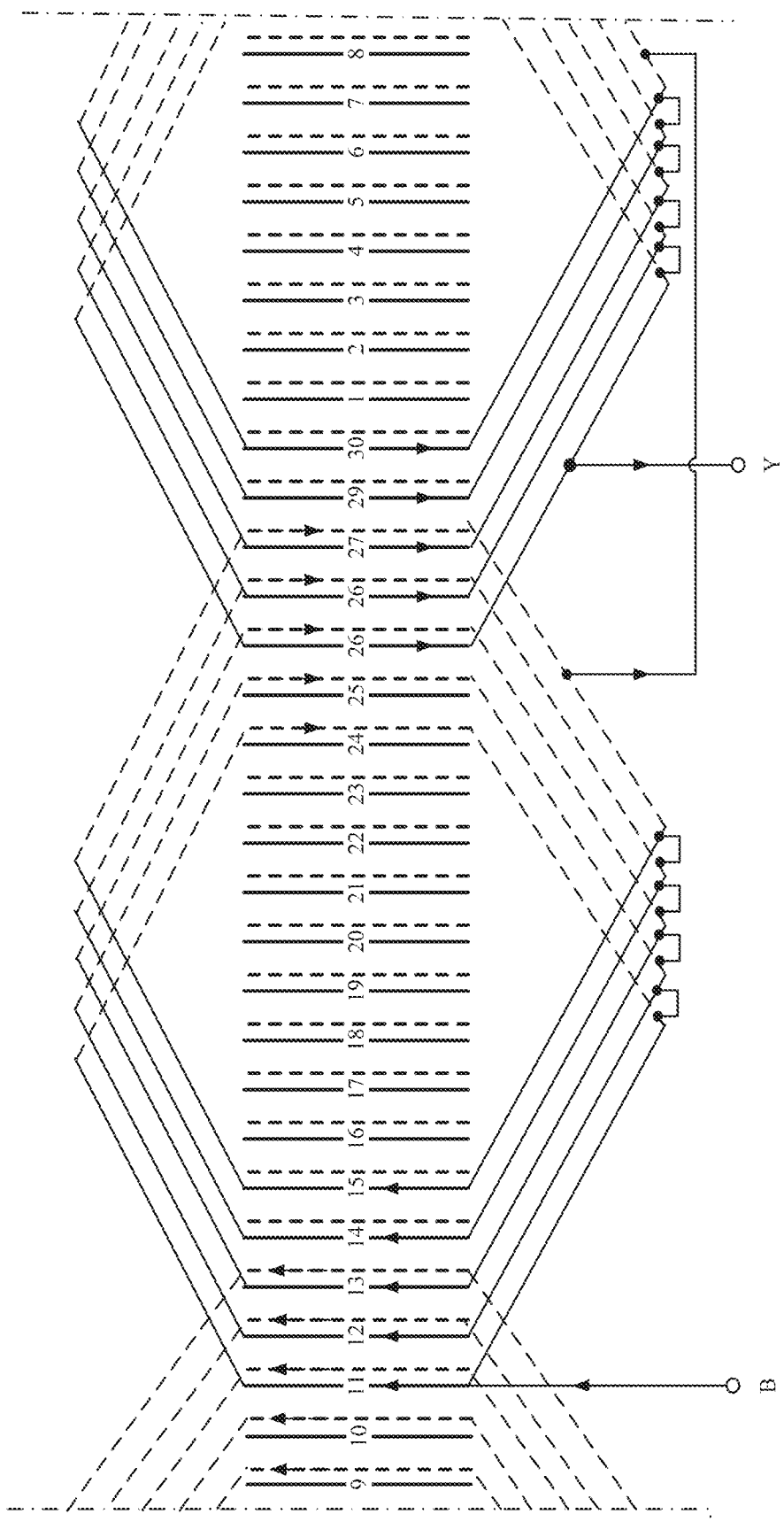
Figure 3C:
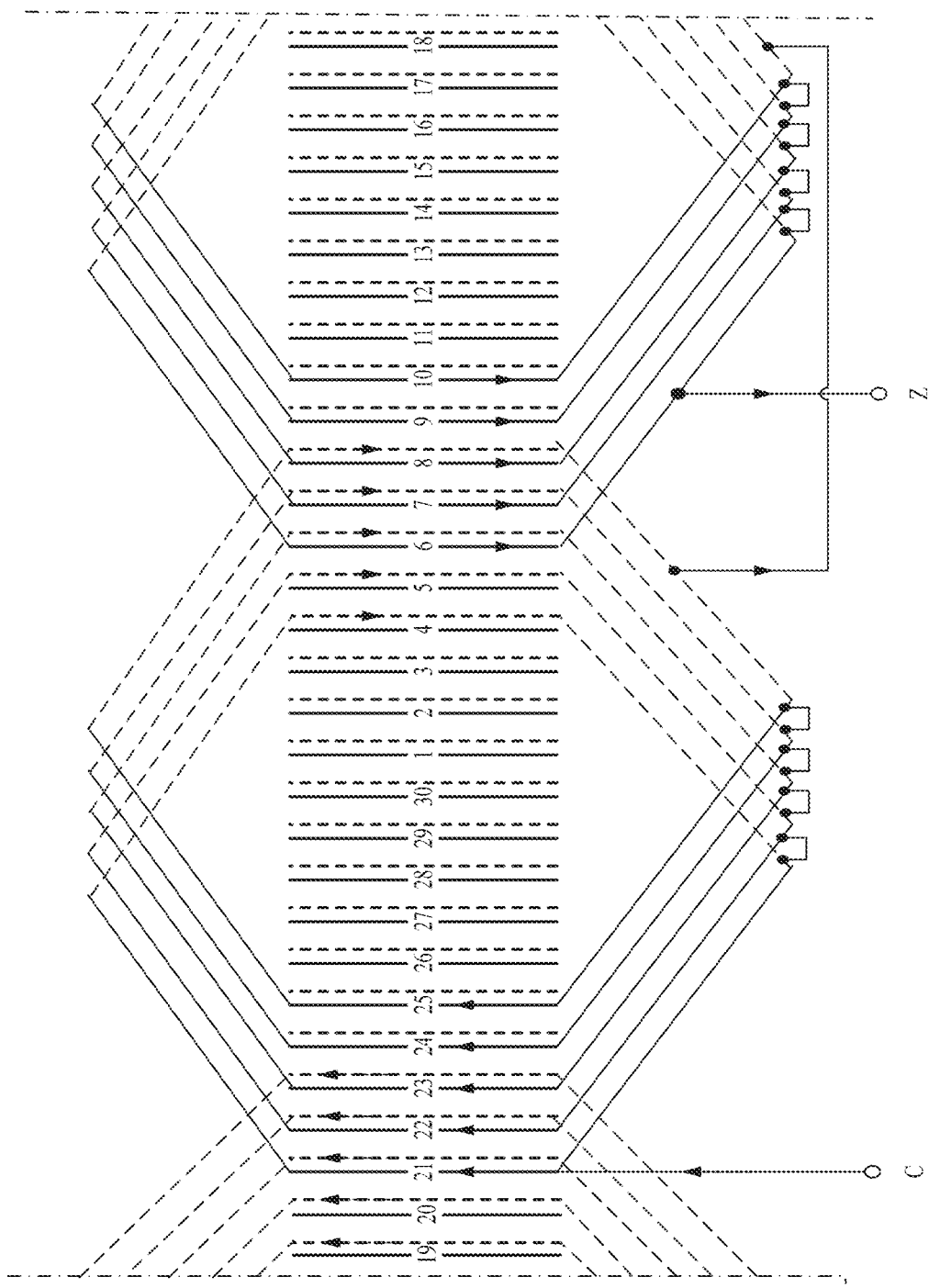

FIGS. 3A-3C are expanded views that respectively show the three phase windings of the rotor in accordance with some embodiments. How the coils are wound and the winding direction of the coils can be seen from these figures. Each of the three phase windings has 2 poles and a pitch of 13 slots. One coil is wound in two layers in 30 slots that are indicated by the numbers of 1-30 in the figures. The exemplary three phases respectively have input nodes A, B and C, and output nodes X, Y and Z.

Figure 3D:
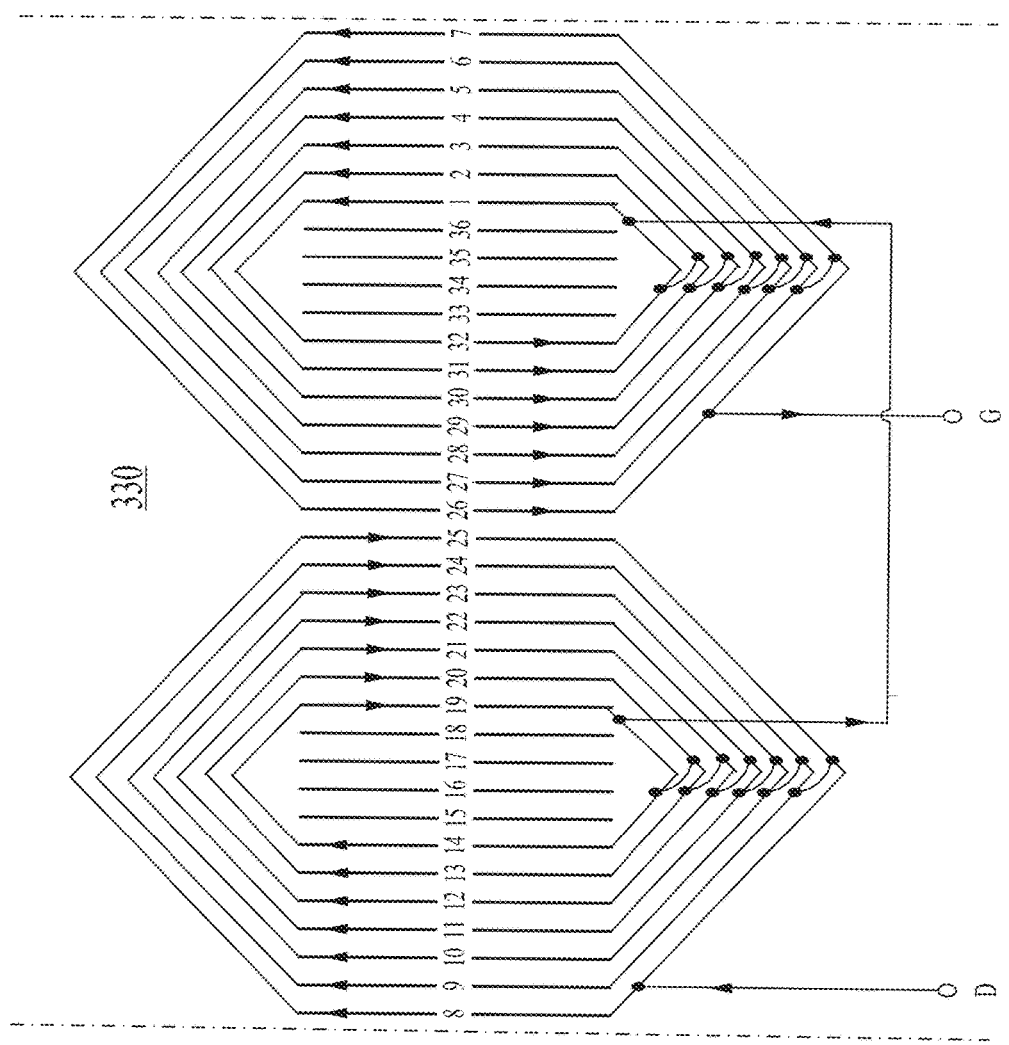
FIG. 3D is an expanded views that shows the single phase windings of the stator in accordance with some embodiments.

FIG. 3D is an expanded views that shows the single phase windings of the stator in accordance with some embodiments. The single phase winding 330 has 2 poles, 36 slots, input node D and output node G. The coils are wound concentrically in a single layer as illustrated in FIG. 3D. When two coils are used as the single phase winding, the two coils can be wound in parallel in a single layer in accordance with some embodiments, which are not illustrated in FIG. 3D. When three coils are used as the single phase winding, two of the three coils can be wound in parallel in a first layer and another can be wound in a second layer.

The single phase winding of the stator 130 may also provide an excitation voltage to the phase windings of the rotor 120 to energize the rotating magnetic field in accordance with some embodiments. The output voltage provided to the electric load from the stator side tends to vary when the engine speed changes. The output voltage is induced and affected by the magnetic field induced in the rotor windings. To prevent the output voltage from changing, the current in the phase windings of the rotor is regulated to compensate for the variation tendency of the induced voltage. In this manner, the amplitude and the frequency of the output voltage output from the stator 130 are kept stable. To provide both the output voltage and the excitation voltage, the single phase winding of the stator 130 includes an excitation portion 130B, in addition to the output portion 130A described above. The output portion 130A and the excitation portion 130B provides the output voltage to the load and the excitation voltage to the rotor windings respectively. The output portion 130A may include more than one coil to provide an output voltage at dual levels as described above.

Figure 4:
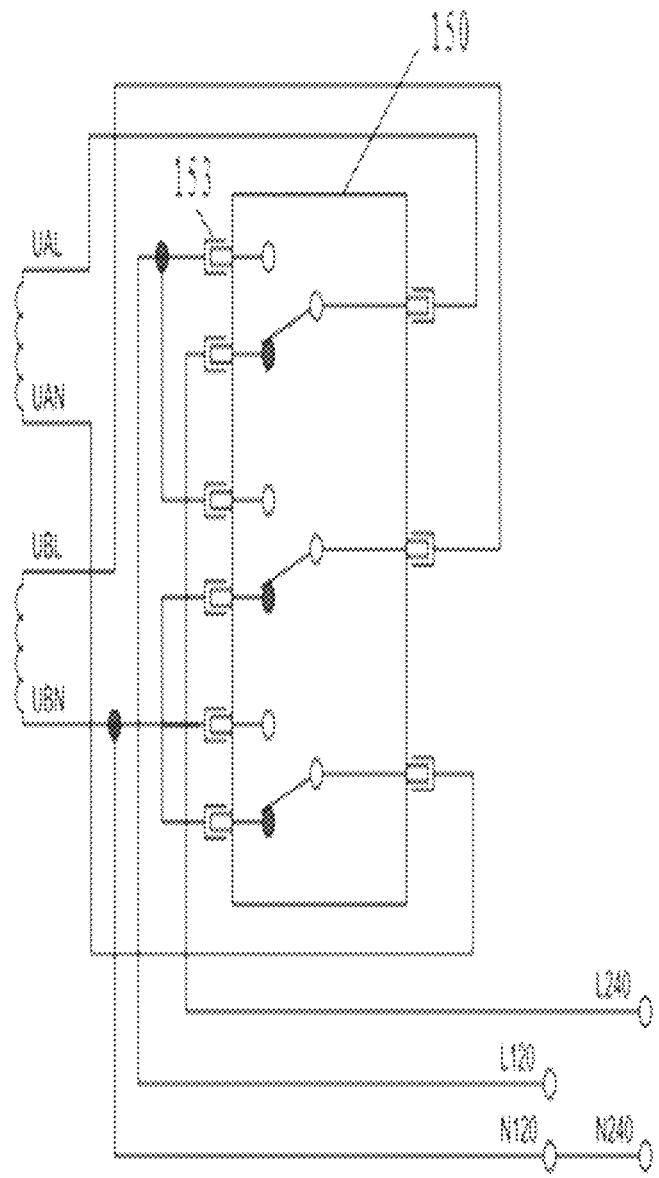
FIG. 4 illustrates a switch used in a power generating apparatus in accordance with some embodiments.

The switch 150 may be a manually operated changeover switch or other similar switches. FIG. 4 illustrates a switch used in a power generating apparatus in accordance with some embodiments. The switch 150 is a packet-type switch mainly consisting of a set of fixed contacts, a mechanism such as a blade that is movable manually or by a cam between one contact and the other to selectively establish a circuit at a particular switching position such as the white contact and the black contact illustrated in FIG. 4. A user may move the blade to the white contact or the black contact B so that the first segment 130A1 and the second segment 130A2 are selectively in parallel connection or series connection. In this manner, an output voltage at dual levels, a low voltage (for example, 120 volts) and a high voltage (for example, 240 volts) is generated and delivered from the output portion 130A to the switch 150. The switch 150 has binding posts 153 that are connected with power lines L240, N240, N120 and L120 to apply the high and low voltages to the electrical load. For example, when the blade is moved to the white contact as illustrated in FIG. 4, the first segment 130A1 and the second segment 130A2 are connected in series and a high voltage is delivered to the electrical load. When The terminal line UAL of the first segment 130A1 and the terminal line UBL of the second segment 130A2 are connected, and the terminal lines UAN, UBN are connected (i.e., when the blades are moved to the black contact in FIG. 4), the first segment 130A1 and the second segment 130A2 are in parallel connection, and a low voltage is delivered to the electrical load. The low voltage of 120 volt can be supplied for lighting and convenience outlets that are in connection with the switch 150, and the high voltage of 240 volt can be supplied for higher-demand appliances such as space heating, air conditioning, kitchen stoves and water heaters. In some embodiments, the switch 150 (including any sensor associated with the switch 150) may send a signal to the excitation control device, indicating whether the one or both of the segments are connected or whether the connection is in parallel or in series.

Optionally, a plug connected with the electric load and two sockets connected with the first segment 130A1 and the second segment 130A2 may be used by a user to switch between the low voltage and the high voltage. For example, the user may put the plug in one socket through which the first segment 130A1 and the second segment 130A2 are in series connection to provide the electric load with the high voltage. The user may put the plug in the other socket through which the first segment 130A1 and the second segment 130A2 are in parallel connection (or either of the two segments connected) to provide the electric load with the low voltage.

The excitation portion 130B may include one coil that has terminal lines connected to the phase windings of the rotor U, V and W to apply the induced voltage generated in the excitation portion 130B to the phase windings for energizing the rotating magnetic field. The excitation portion 130B is independent of the output portion 130A. Therefore, the excitation portion 130B can provide an excitation voltage greater than the output voltage in a simple manner. For example, an excitation voltage of 320 volts (higher than a normal 220 volts) can be provided when the excitation portion 130B has a sufficient number of winding turns.

Figure 5:
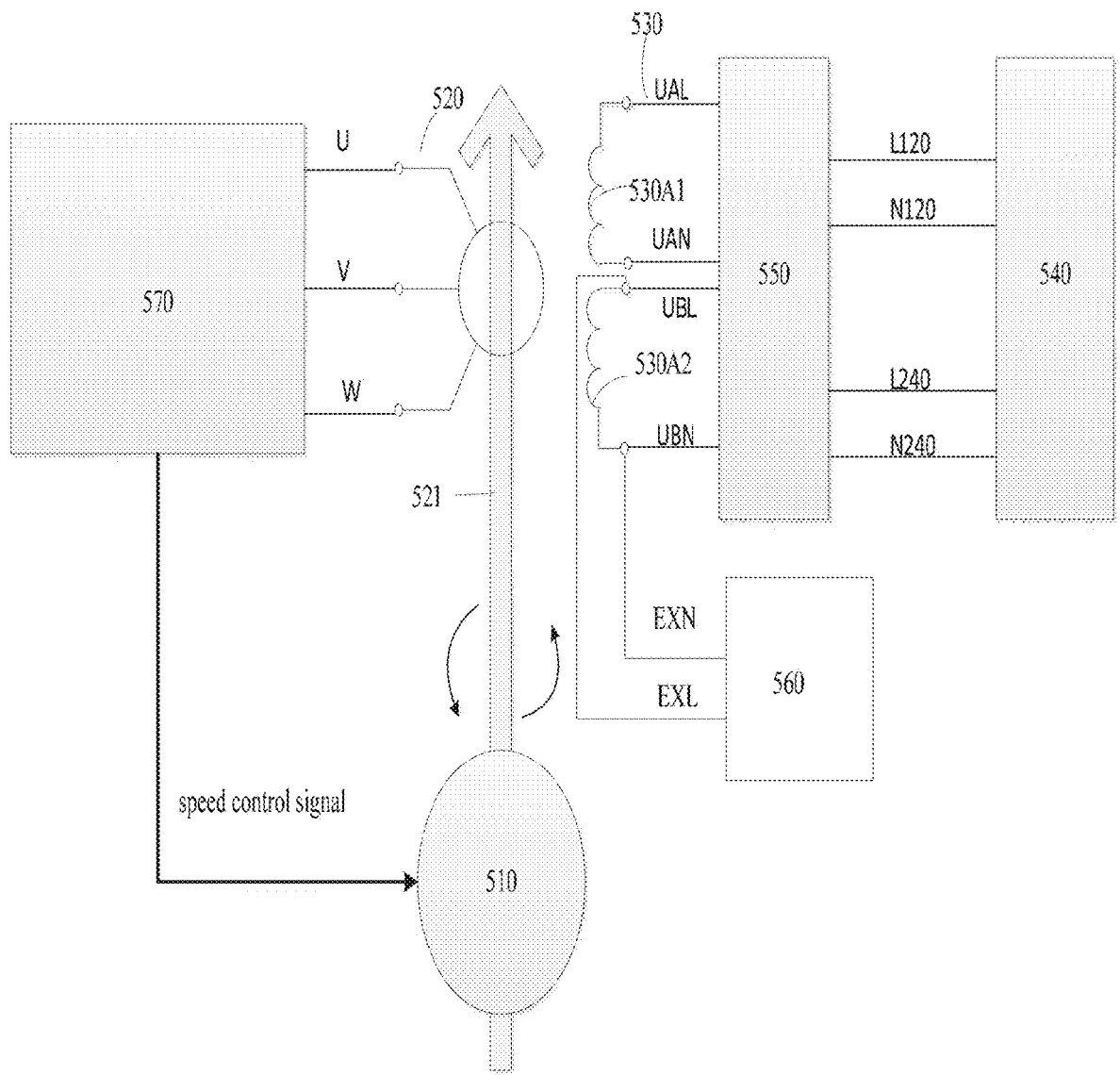
FIG. 5 is a schematic diagram of another off-grid power generating apparatus for providing an output voltage at dual levels to an electrical load in accordance with some embodiments.

FIG. 5 is a schematic diagram of another off-grid power generating apparatus for providing an output voltage at dual levels to an electrical load in accordance with some embodiments. Similar reference numbers are used in FIGS. 1 and 5 to indicate similar structural parts. For example, the reference number of 170 in FIG. 1 and the reference number of 570 in FIG. 5 both refer to the excitation control device for controlling and monitoring the alternator and the engine. The single phase winding of the stator 530 may include a first portion 530A1 and a second portion 530A2 in accordance with some embodiments. The first portion 530A 1 may include one coil with terminal lines UAL and UAN, and the second portion 530A2 may include another coil with terminal lines UBL and UBN. The terminal lines UAL, UAN, UBL and UBN are separately connected to the switch 550. A user may switch over the switch 550 to selectively connect the first portion 530A1 and the second portion 530A2 in parallel or in series to obtain an output voltage of 120 volts or 240 volts. Unlike the apparatuses illustrated in FIG. 1 that have separate excitation portions, the first portion 530A1 or the second portion 530A2 is also used to provide the excitation voltage. For example, as illustrated in FIG. 5, the second portion 530A2 has an extra pair of terminal lines EXN and EXL that are connected to the phase windings of the rotor (not illustrated in FIG. 5).

The second portion 530A2 may include more than one coil in series connection in accordance with some embodiments (not illustrated in FIG. 5), for example, a first coil and a second coil connected in series. The live line and neutral line of the first coil are connected to the switch to provide the output voltage, and the live lines of the first coil and the second coil are connected to the rotor circuit, i.e., the series voltage generated by the first coil and the second coil in series connection works as the excitation voltage. Compared with a stator with a separate excitation coil, the coil number of the excitation coil in this stator is reduced.

Figure 6A:
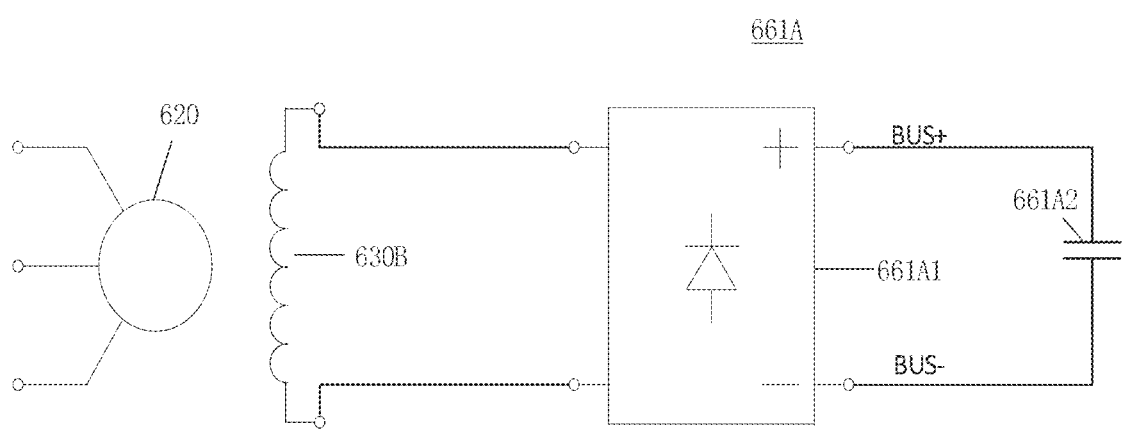
FIG. 6A illustrates a DC bus voltage regulator in accordance with some embodiments.
Figure 6B:
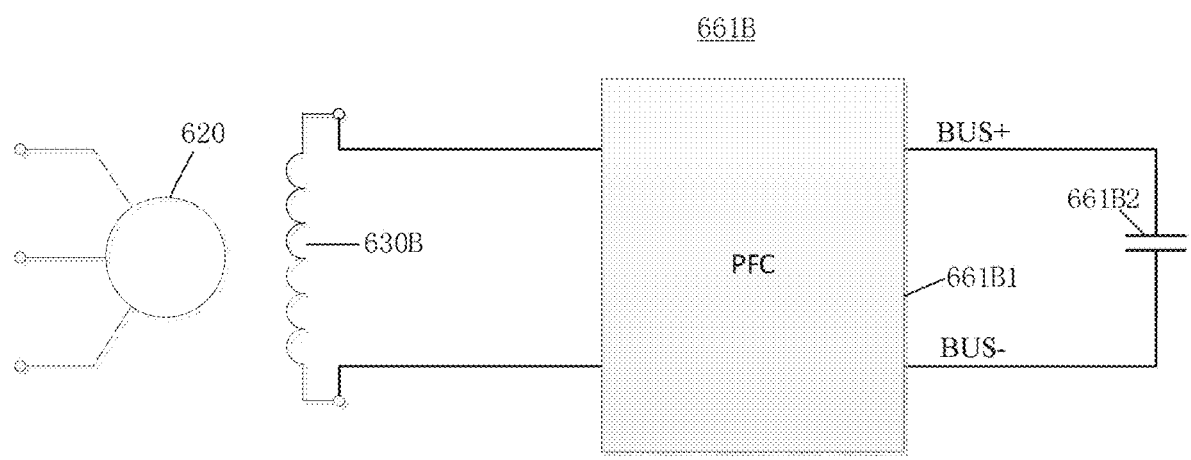
FIG. 6B illustrates another DC bus voltage regulator in accordance with some embodiments.

A frequency conversion device 560 may be provided between the second portion 530A2 and the phase windings of the rotor in accordance with some embodiments. The frequency conversion device 560, which is the so-called converter, regulates the induced voltage generated in the excitation portion 530A2 to generate a voltage with a desired frequency and amplitude to provide to the phase windings of the rotor for energizing the rotating magnetic field. The frequency conversion device 560 may include a DC bus voltage regulator that receives the excitation voltage from the single phase winding of the stator and outputs a DC voltage to buses BUS+ and BUS−. FIG. 6A illustrates a DC bus voltage regulator 661A in accordance with some embodiments. The DC bus voltage regulator 661A includes an uncontrolled Bridge Rectifier 661A that may have four individual rectifying diodes 661A1 connected in "bridge" configuration to receive the excitation voltage from the excitation portion 630B or either of the two portions of the single phase winding and generate the desired DC voltage. The main advantage of this bridge rectifier is that it does not require a special center tapped transformer, thereby reducing its size and cost. A bus capacitor 661A2 may be provided for smoothing the output of the uncontrolled Bridge Rectifier 661A to produce a DC voltage. FIG. 6B illustrates another DC bus voltage regulator 661B in accordance with other embodiments. A Power factor correction device 661B1 is used to rectify and boost the excitation voltage received from the single phase winding of the stator. A bus capacitor 661B2 may be provided to store energy and filter out high frequency voltage components.

Figure 7:
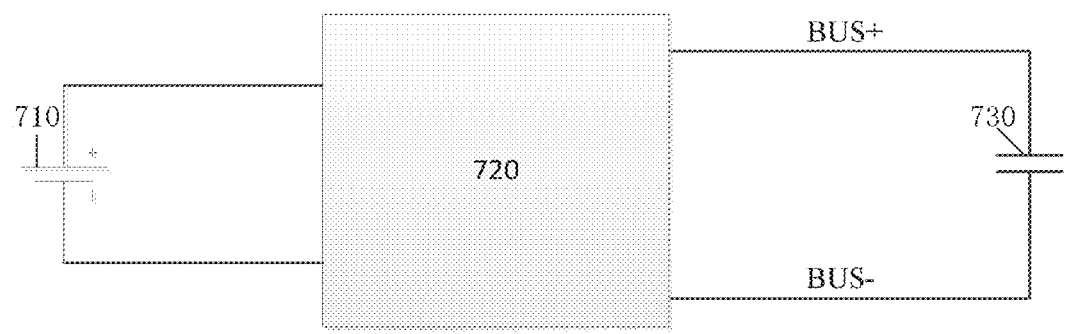
FIG. 7 illustrates another embodiment of providing an excitation voltage to the phase windings of the rotor in accordance with some embodiments.

The single phase winding of the stator may not provide the excitation voltage to the rotor. FIG. 7 illustrates another embodiment of providing an excitation voltage to the phase windings of the rotor. A DC power source, which may be a battery 710, is used for supplying a DC voltage. A DC-DC converter 720 is connected with the battery 710 to increase the amplitude of the DC voltage before the DC voltage is applied to the buses BUS+ and BUS− that is connected to the phase windings of the rotor for energizing the rotating magnetic field. A bus capacitor 730 may be provided to store energy and filter out high frequency voltage components.

Reference is now made back to FIGS. 1 and 5. The power generating apparatus may include the excitation control device 170 or 570 for controlling and monitoring the alternator and the engine 110 or 510. A microprocessor-based or otherwise computer-driven systems can work as the excitation control device. The excitation control device 170 or 570 has a processor and a memory. The processor operates under the direction of stored program instructions regarding the operation of the alternator. The excitation control device 170 or 570 is electrically connected with the engine and the engine 110 or 510. For example, the control device 170 or 570 is physically attached to the alternator, and connected with the engine 110 or 510 via wires or wireless mechanism. The excitation control device 170 or 570 collects operation data measured by the one or more sensors (which will be described below with reference to FIGS. 9 and 10). The excitation control device 170 or 570 may also be connected with the engine 110 or 510 with the use of a wired connection or a wireless connection. The excitation control device 170 or 570 calculates the load power with the measured operation data from the sensors, and regulate speed of the engine 110 or 510 in response to the calculated load power. The excitation control device 170 or 570 also modulates the amplitude and frequency of the excitation voltage generated in the single phase winding of the stator so that the amplitude and frequency of the output voltage output by the power generating apparatus remain fixed. While the excitation control device 170 or 570 directly controls the engine 110 or 510 in the embodiments described above, the engine 110 or 510 may also be directly controlled by an engine control module (ECM) not shown in the figures, which may be physically attached to the engine 110 or 510. The excitation control device 170 or 570 may controls the ECM. Control signals from the excitation control device 170 or 570 can be transmitted to the ECM through a communication bus. The ECM controls engine speed, and thereby controls the output power of the alternator. The ECM may also monitors a variety of engine characteristics such as fuel consumption, engine start information and oil pressure.

Figure 8:
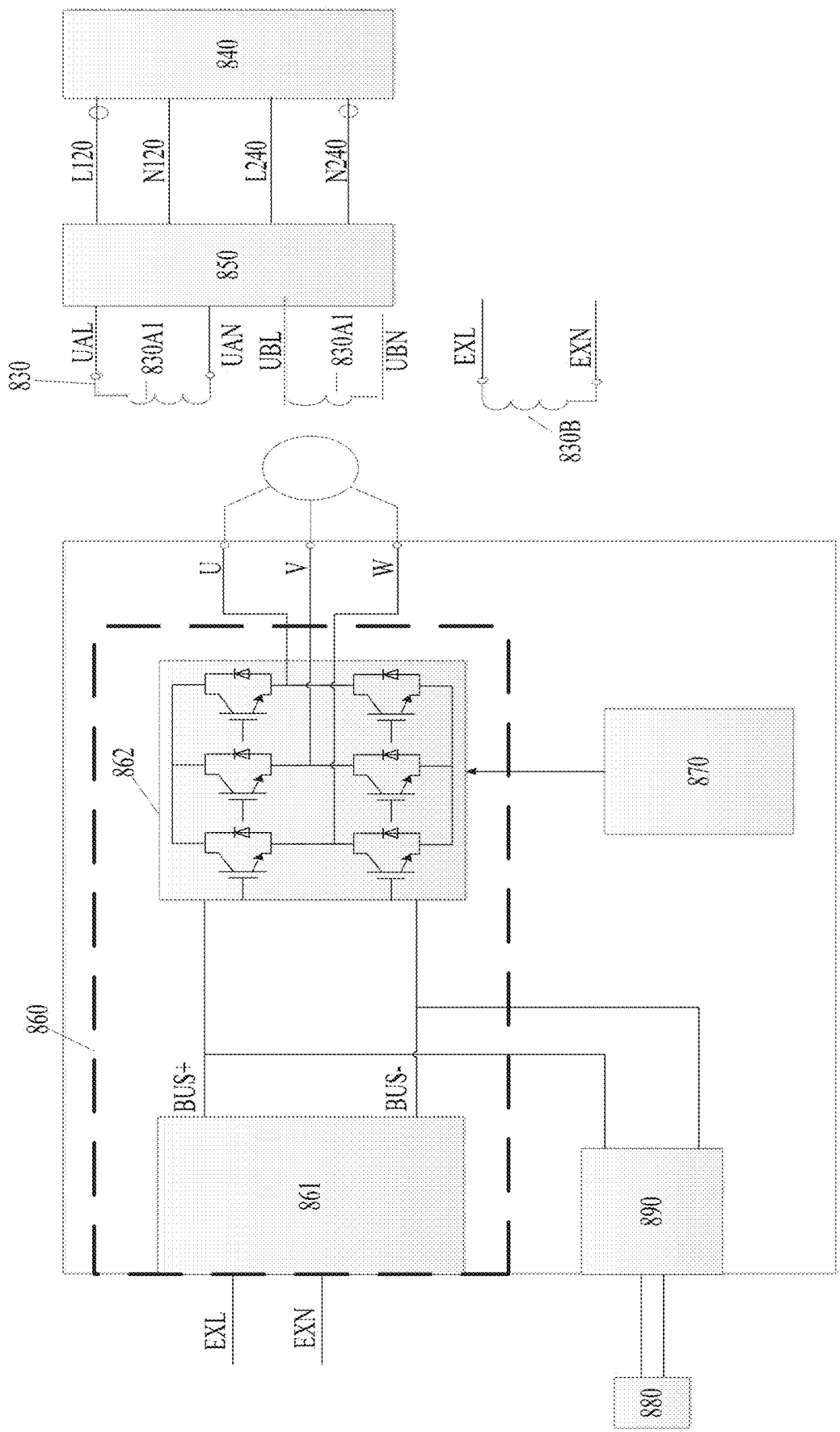
FIG. 8 is a schematic diagram of another off-grid power generating apparatus for providing an output voltage at dual levels to an electrical load in accordance with some embodiments.

FIG. 8 is a schematic diagram of another off-grid power generating apparatus for providing an output voltage at dual levels to an electrical load in accordance with some embodiments. This exemplary apparatus is similar to those described previously with reference to FIGS. 1 and 5 and therefore identical and similar parts will not be discussed again herein. The apparatus includes a frequency conversion device 860. The frequency conversion device 860 mainly includes a DC bus voltage regulator 861 and an inverter 862. The DC bus voltage regulator 861 is similar to those described above with reference to FIGS. 6A and 6B, and therefore the frequency conversion device will not be described again herein.

The inverter 862 can be a two-phase, three-phase, four-phase or five-phase DC/AC inverter corresponding to the number of the symmetric phase windings of the rotor. In FIG. 8, the inverter 862 is illustrated as a three-phase six-switch DC/AC inverter that receives control pulse signals, for example, in the form of a PWM (pulse-width modulation) or SVPWM (Space Vector Pulse Width Modulation) waveform from the excitation control device 870. The control pulse signals are duty ratios of switching-on time in substance. The excitation control device 870 is programmed to provide the pulse signals that are PWM or SVPWM excitation signals with a desired amplitude and frequency. To keep the induced voltage constant, the pulse signals are employed to modulate the amplitude and frequency of the current in the phase windings of the rotor, in order to change the magnetic field in a way that compensate or offset the variation tendency of the induced voltage. The excitation control device 870 applies the excitation signals to the rotor windings to regulate the intensity of the rotating magnetic field generated in the rotor windings and the rotating speed of the rotating magnetic field relative to the rotor. As a result, the amplitude and frequency of the output voltage output from the stator. i.e., the output voltage of the apparatus, are kept stable. The PWM/SVPWM waveform can be a square wave, modified sine wave and sine wave mainly depending on the circuit design of the inverter 862. Each leg of the inverter 862 may be connected with one phase winding of the rotor through wires. The inverter 862 has one or more switching element on each leg. The switching element can be a semiconductor switching element such as IGBT, BJT, MOSFET, GTO, SCR and IGCT. A pair of IGBTs is provided on each leg of the inverter 862 in accordance with some embodiments as illustrated in FIG. 8. The pulse signals from the excitation control device 870 successively control the switch ON and OFF time of the switching elements with duty ratios. A relatively stable DC voltage from the DC bus voltage regulator 861 is applied to the inverter 862 as illustrated in FIG. 8. The required input DC voltage of the inverter 862 mainly depends on the design and function of the inverter 862. Factors that can be considered include the amplitude of the induced voltage, the rotating speed range of the engine, the structure of the rotor windings, the current and voltage parameters of IGBT, etc. The inverter 862 generates PWM or SVPWM excitation signals with a desired frequency and amplitude, and the excitation signals are employed to modulate the amplitude and frequency of the current in the phase windings of the rotor so that a rotating magnetic field with a desired intensity and rotating speed relative to the rotor is established.

In accordance with some embodiments, the frequency conversion device 860, particularly the inverter 862, is disposed on the rotor side in the embodiments. In other words, the induced voltage generated in the single phase winding of the stator is delivered to the load without going through any frequency conversion device. The induced voltage and the output voltage applied to the load are at the same frequency. As a result, the rated power of the inverter 862 used in the apparatus with a rated power of 7,000 watts is less than 1,500 watts, usually the rated power of the inverter 862 is 700-800 watts. The rated power of an inverter in a power generator with a rated power of 7,000 watts in which an inverter is used to regulate the overall power generated by the generator is usually 7000 watts. Thus, inverters with a much smaller capacity can be used in the apparatus in the embodiments, since the inverter 862 only regulates a fraction of the overall power that is supplied to the rotor for regulating the amplitude and frequency of the output voltage of the apparatus output from the stator side. Accordingly, the weight of the inverter 862 is comparatively light and its cost is low. It is estimated that the cost of the inverter accounts for 20% to 60% of the cost of a traditional power generator. Accordingly, the inverter 862 is lighter and more cost-efficient. Therefore, the power generating apparatus in the embodiments described above enjoys a superb advantage in terms of costs.

In accordance with some embodiments, the excitation control device 870 is programmed to modulate the power of the engine, i.e., the speed of the engine. The excitation control device 870 calculates the load power of the engine with the measured operation data from the sensors that are not illustrated in FIG. 8, and modulates the speed of the engine in response to the calculated load power. The power of the engine is regulated to follow a pre-defined engine power-speed characteristic cure of the engine to track the maximum power point. The characteristic curve of the engine is a curve indicating a relationship of operation parameters of the engine, for example, the power, rotation torque and rotation speed of the engine. The characteristic curve can be obtained with experiments and pre-stored in the excitation control device. For a certain load, the excitation control device 870 identifies the corresponding desired rotation speed on the characteristic curve of the engine. In some embodiments, the characteristic curve can also be a table or a formula describing the corresponding relationships between the load and the optimal rotation speed (sometimes with other parameters such as desired voltage as well).

The alternator may also include a battery 880 in accordance with some embodiments. The battery 880 may be electrically separated from the bus BUS+ and BUS− for the sake of safety. The DC voltage of the battery 880 may be applied to the bus BUS+ and BUS− through an excitation voltage provider 890 for providing an excitation voltage for establishing a rotating magnetic field in the rotor windings when the power generating apparatus starts. The excitation voltage provider 890 may be structured in the form of a transformer. The amplitude of the excitation voltage may be quite small, for example from 1 volts to 20 volts.

The apparatus is set to operate at a rotation speed equal to or less than the synchronous speed of the alternator in accordance with some embodiments. For example, when the synchronous speed of the alternator is 3600 rpm, the engine is set to operate at a speed between 3000-3600 rpm in a stable working state. The faster the engine runs, the greater the output power of the engine is. The engine speed of a power generating apparatus will increase up to 3600 rpm as the apparatus picks up its power from an idling state when the apparatus starts to its rated power. When the rotating speed of the engine reaches 3600 rpm, the excitation voltage becomes a DC voltage.

Thus, an apparatus will always operate in a sub-synchronous or synchronous state when the apparatus is set to operate at a rotation speed equal to or less than the synchronous speed of the alternator. This means that electrical energy in the apparatus always flows from the stator side to the rotor side. No energy flows in the opposite direction. This feature makes it possible to use low cost devices or parts with a unidirectional characteristic such as the uncontrolled Bridge Rectifier illustrated in FIG. 6A in the apparatus. It should be appreciated that the apparatus may operate at a speed more than the reference speed in undesirable operation conditions. Protection mechanisms such as a circuit breaker may be provided in the apparatus to stop it from operation when the speed is excessive.

Figure 9:
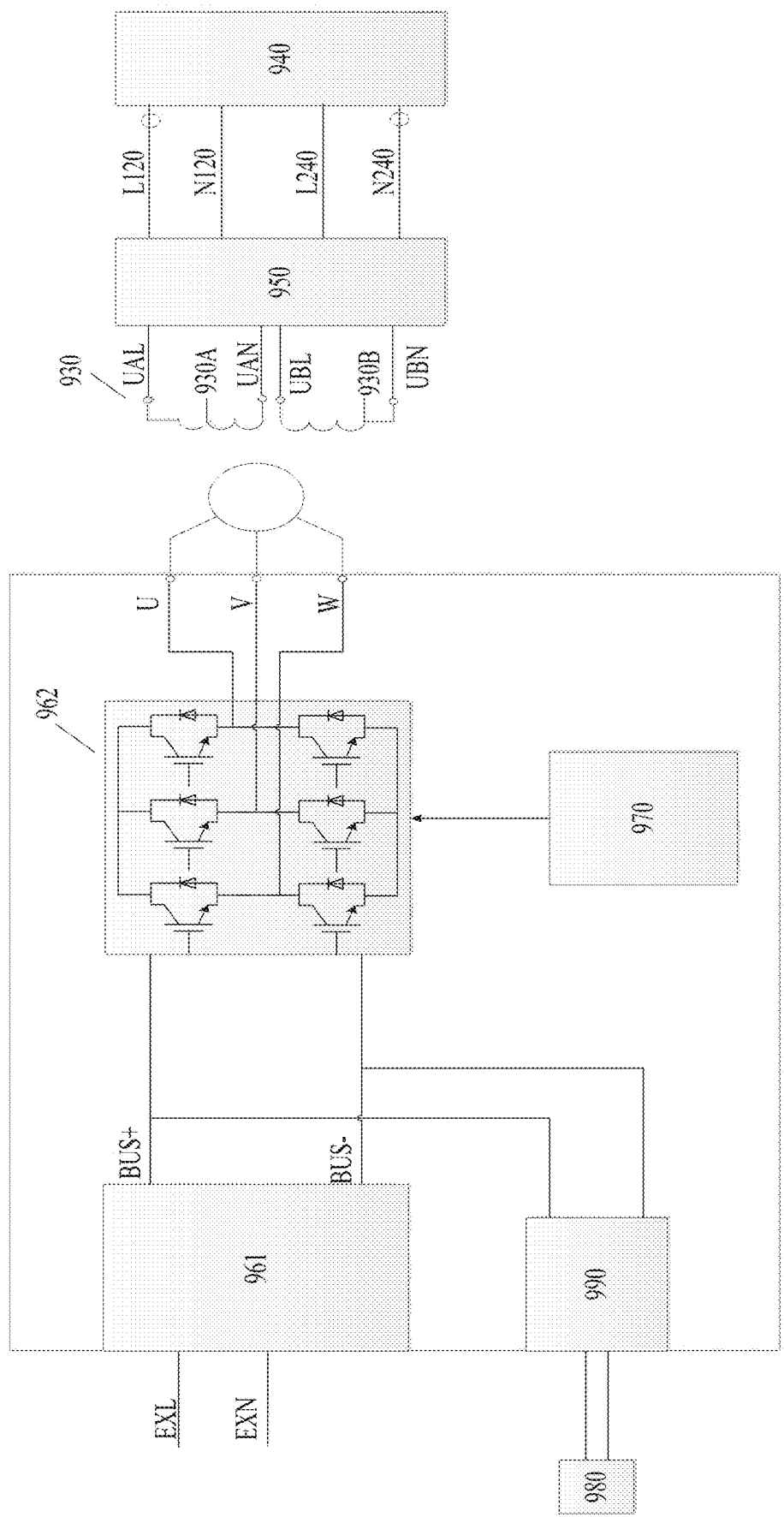
FIG. 9 is a schematic diagram of yet another off-grid power generating apparatus for providing an output voltage at dual levels to an electrical load in accordance with some embodiments.

FIG. 9 is a schematic diagram of yet another off-grid power generating apparatus for providing an output voltage at dual levels to an electrical load in accordance with some embodiments.

The inverter 962 can be two-phase, three-phase, four-phase or five-phase DC/AC inverters corresponding to the number of the symmetric phase windings of the rotor. In FIG. 9, the inverter 962 is illustrated as a three-phase six-switch DC/AC inverter that receives control pulse signals, for example, in the form of a PWM (pulse-width modulation) or SVPWM (Space Vector Pulse Width Modulation) waveform from the excitation control device 970. The control pulse signals are duty ratios of switching-on time in substance. The excitation control device 970 is programmed to provide the pulse signals that are PWM or SVPWM excitation signals with a desired amplitude and frequency. The pulse signals are employed to modulate the amplitude and frequency of the current in the phase windings of the rotor to compensate for the variation tendency of the amplitude and frequency of the induced voltage generated in the single phase winding of the stator, which is caused by the speed variations of the engine corresponding to load changes. The excitation control device 970 applies the excitation signals to the rotor windings to regulate the intensity of the rotating magnetic field generated in the rotor windings and the rotating speed of the rotating magnetic field relative to the rotor. As a result, the amplitude of the output voltage of the stator, i.e., the output voltage of the apparatus, is kept stable and the frequency of the output voltage is maintained constant. The PWM/SVPWM waveform can be a square wave, modified sine wave and sine wave depending on the circuit design of the inverter 962. Each leg of the inverter 962 may be connected with one phase winding of the rotor through wires. The inverter 962 has one or more switching elements on each leg. The switching elements can be semiconductor switching elements such as IGBT, BJT, MOSFET, GTO, SCR and IGCT. A pair of IGBTs is provided on each leg of the inverter 962 in accordance with some embodiments as illustrated in FIG. 9. The pulse signals from the excitation control device 970 successively control the switch ON and OFF time of the switching elements of the inverter 962 with duty ratios. A relatively stable DC voltage from the DC bus voltage regulator 961 is applied to the inverter 962 as illustrated in FIG. 9. The required input DC voltage of the inverter 962 depends on the design and function of the inverter 962. Factors that can be considered include the amplitude of the induced voltage, the rotating speed range of the engine, the structure of the rotor windings, the current and voltage parameters of IGBT used, etc. The inverter 962 generates PWM or SVPWM excitation signals with desired frequency and amplitude, and the excitation signals are employed to modulate the amplitude and frequency of the current in the phase windings of the rotor so that a rotating magnetic field with the desired intensity and rotating speed relative to the rotor is established. The rated power of the inverter 962 used in the apparatus with a rated power of 7,000 watts is less than 1,500 watts, usually is 700-800 watts. The rated power of an inverter in a power generator with a rated power of 7,000 watts in which an inverter is used to regulate the overall power generated by the generator is usually 7000 watts. Thus, inverters with a much smaller capacity can be used in the apparatus in the embodiments, since the inverter 962 only regulates a fraction of the overall power that is supplied to the rotor for regulating the amplitude and frequency of the output voltage of the apparatus output from the stator side. Accordingly, the inverter 962 is comparatively light and cost-efficient. It is estimated that the cost of the inverter accounts for 20% to 60% of the cost of a traditional power generator. Therefore, the power generating apparatus in the embodiments described above enjoys a superb advantage in terms of costs.

The excitation control device 970 is programmed to regulate the power of the engine, i.e., the speed of the engine. The excitation control device 970 calculates real time load power with the measured operation data from the sensors that are not illustrated in FIG. 9, and regulates speed of the engine in response to the calculated real time load power. The power of the engine is regulated to follow a pre-defined engine power-speed characteristic of the engine to track the maximum power point. The pre-defined engine power-speed characteristic of the engine can be stored in the excitation control device 970.

The alternator may also include a battery 980 in accordance with some embodiments. The battery 980 may be electrically separate from the bus BUS+ and BUS− for the sake of safety. The DC voltage of the battery 980 may be applied to the bus BUS+ and BUS− through an excitation voltage provider 990 for providing an excitation voltage for establishing a rotating magnetic field in the rotor windings when the power generating apparatus starts. The excitation voltage provider 990 may be structured in the form of a transformer. The amplitude of the excitation voltage may be quite small, for example from 1 volts to 20 volts.

The difference between FIG. 8 and FIG. 9 is that the apparatus in FIG. 9 does not have a separate excitation portion as the apparatus illustrated in FIG. 5. It is easy for those skilled in the art to understand the principle of the apparatus in FIG. 9 thus no more description will be repeated herein.

In accordance with some embodiments, an off-grid portable generator set for providing an output voltage at dual levels to an electrical load is provided in accordance with some embodiments. The generator set includes an engine, an induction asynchronous alternator and an excitation control device. The induction asynchronous alternator includes a rotor, a switch, a stator and one or more sensors. The rotor is coaxially coupled to the engine and includes a plurality of symmetric phase windings. The switch is operatively connected with the electrical load, and is movable between a first position and a second position by a user. The stator has a single phase winding that includes an output portion. The output portion has a first segment and a second segment each of which has at least one coil configured to generate an induced voltage. The first segment and the second segment are operatively and separately connected with the switch. The dual-level output voltage includes a high voltage and a low voltage. The first segment and the second segment are configured to be connected in series at the first position of the switch for providing the high voltage to the electrical load via the switch, and connected in parallel at the second position of the switch to provide the low voltage to the electrical load via the switch. The one or more sensors is configured to measure the operation data of the apparatus. The excitation control device is operatively connected with the engine and the alternator, and is configured to control the induced voltage generated in the single phase winding of the stator to make the induced voltage have a predetermined frequency by regulating the rotating magnetic field generated in the phase windings of the rotor. The excitation control device is also configured to calculate load power of the load in accordance with at least the operation data measured by the one or more sensors, and regulate speed of the engine in response to the calculated load power.

The power generating apparatus for powering an electrical load is described with reference to FIGS. 1-9 above. The apparatus, as previously described, having a stator with a single phase winding and a rotor with a plurality of symmetric phase windings poses a challenge to conventional control strategies for generators. It is difficult to control an apparatus having a stator with a single phase winding in which an output voltage is generated without frequency conversion. A simple and cost-effective control system for the apparatus is provided in this disclosure, which will be described with reference to FIGS. 10-15.

In accordance with some embodiments, in the control system, an excitation signal is employed to modulate the frequency and amplitude of the current in the rotor windings. Thereby the intensity of the rotating magnetic field and its rotating speed relative to the rotor are modulated. In this manner, the amplitude and frequency of the output voltage are kept stable. Meanwhile, the rotating speed of the engine is variable in response to load changes so that the fuel efficiency of the engine is optimized. This control system enables the power generating apparatus to change its engine speed in a wide range as the load it drives changes.

Figure 10:
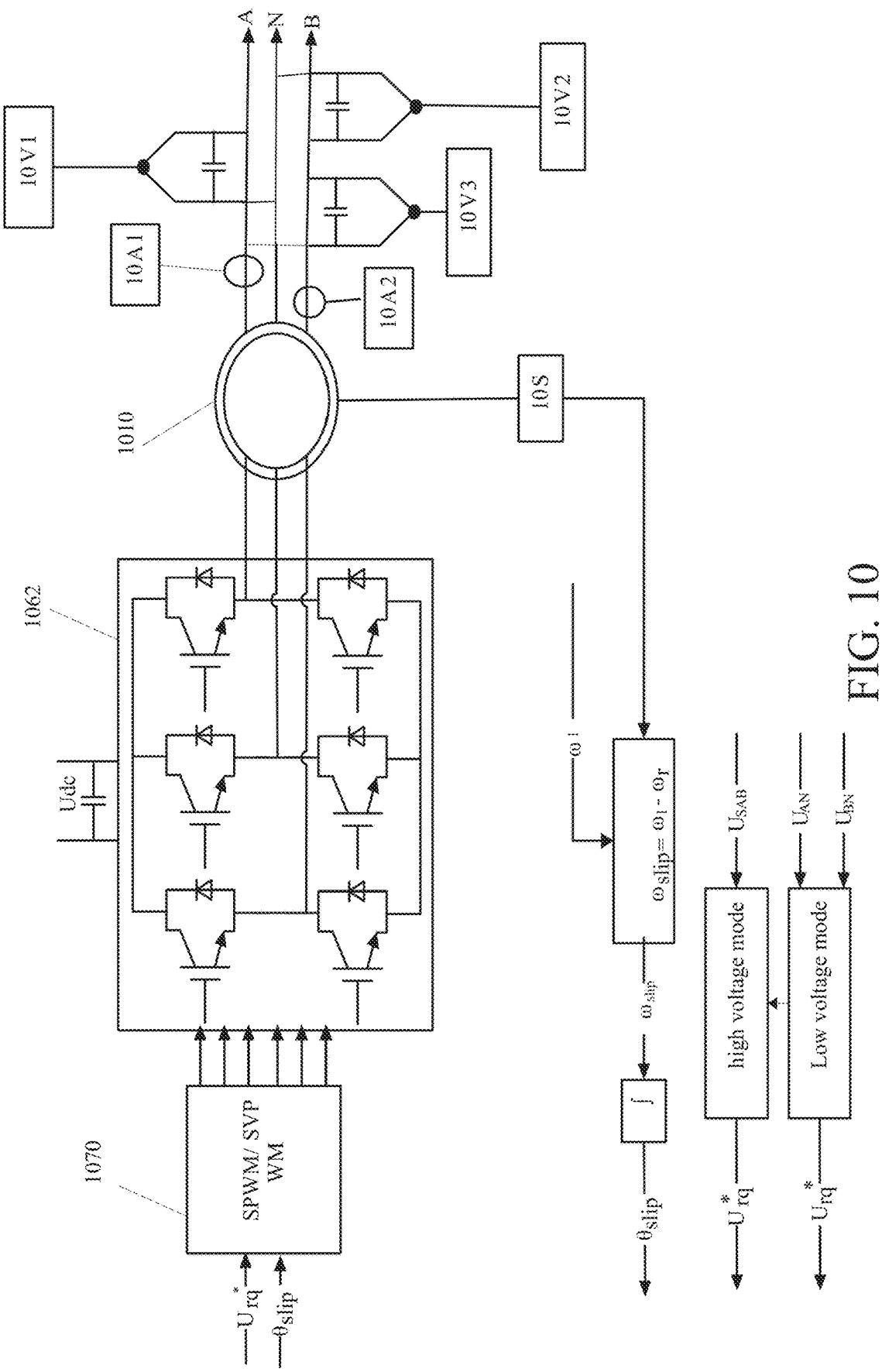
FIG. 10 illustrates a control system for implementing a control strategy in accordance with some embodiments.
Figure 11A:
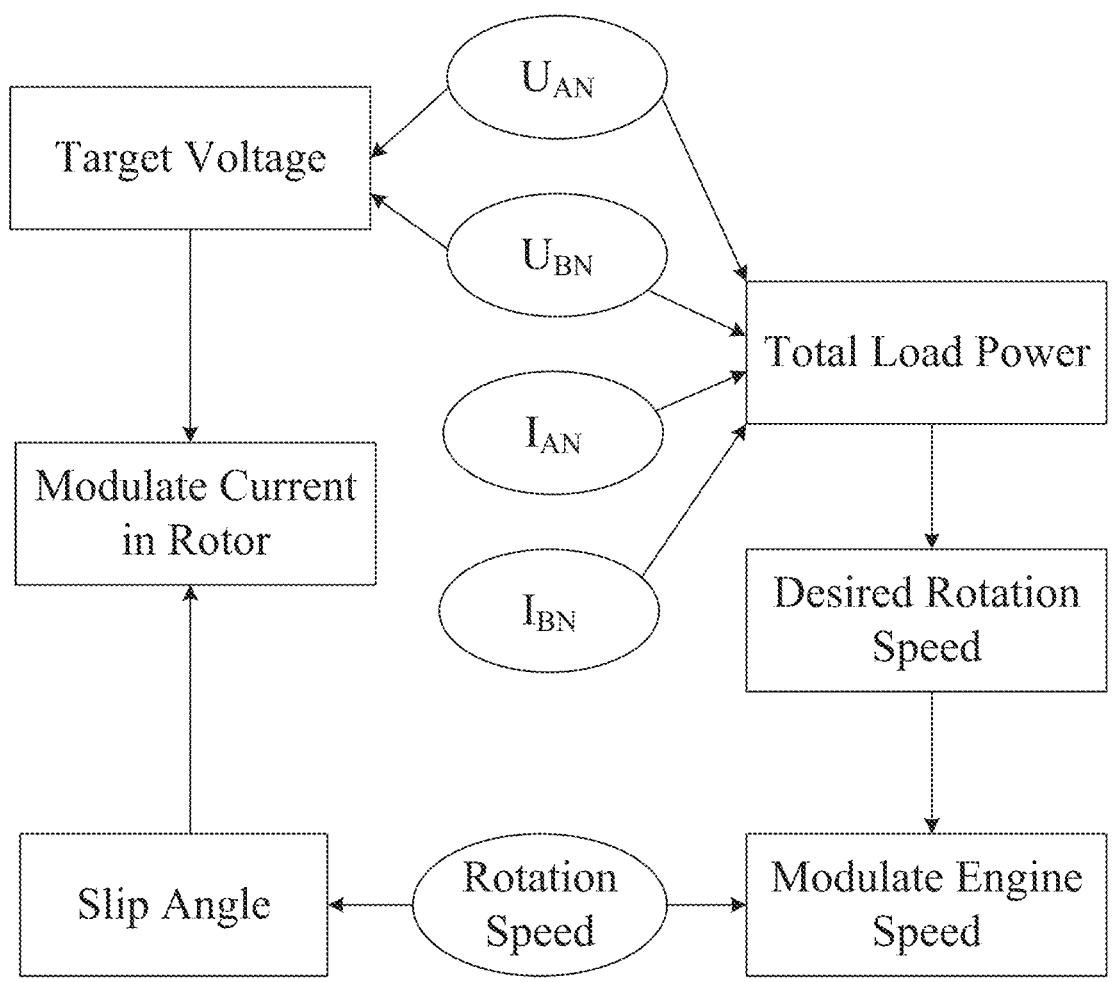
FIGS. 11A and 11B are flowcharts of another control strategy corresponding to the control system in FIG. 10 in accordance with some embodiments.
Figure 11B:
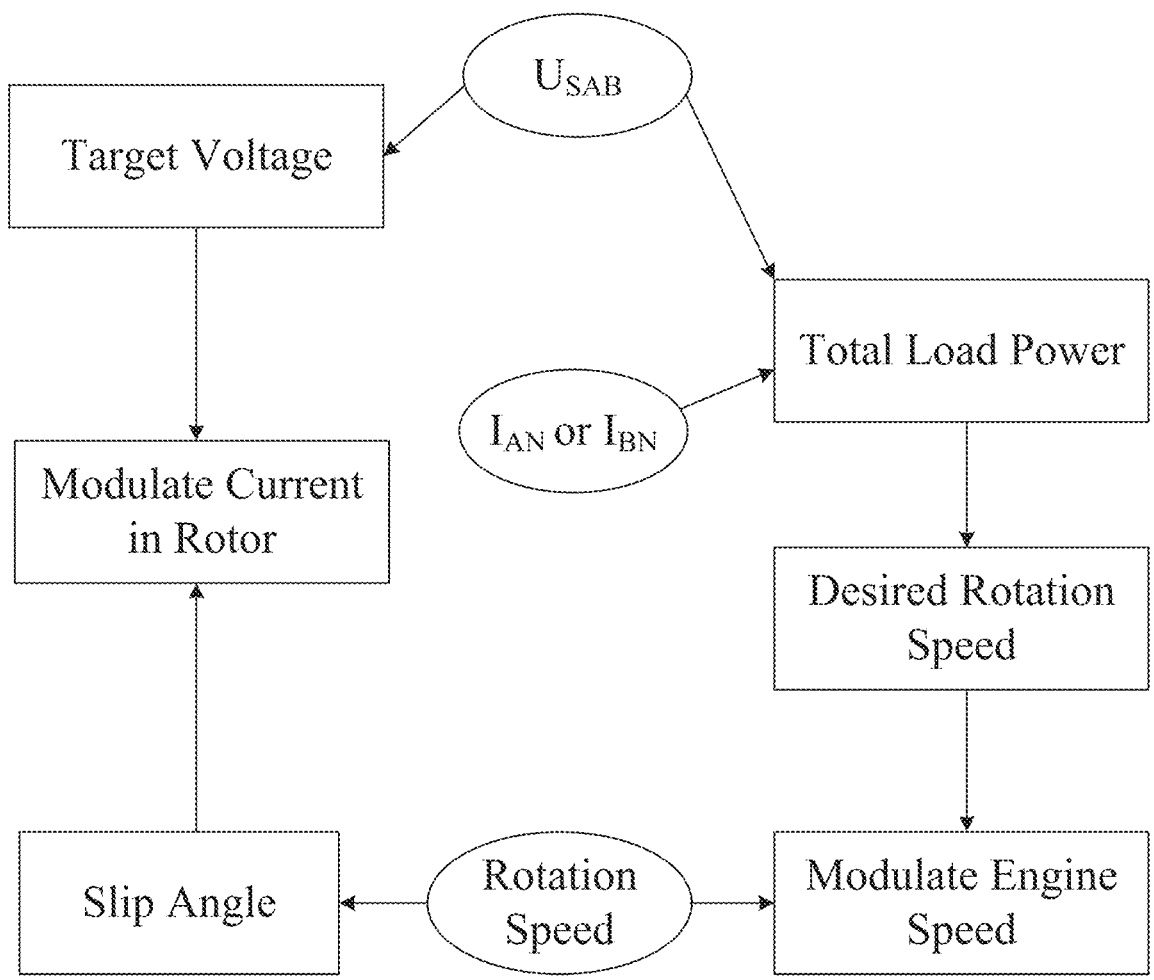

FIG. 10 illustrates a control system for implementing a control strategy in accordance with some embodiments. FIGS. 11A and 11B are flowcharts of another control strategy corresponding to the control system in FIG. 10 in accordance with some embodiments. The single phase winding of the stator outputs a dual level voltage through live terminals A, B and neutral terminal N to the load, i.e., a high voltage and a low voltage. The high voltage is live to live voltage $U_{SAB}$, and the low voltage is live to neutral voltage $U_{AN}$ and $U_{BN}$. A user can operate the switch to switch between the low voltage mode and the high voltage mode. A switchover signal indicating the voltage mode is transmitted, for example through a wire or a wireless communications device such as a WIFI device, from the switch to the excitation control device 1070.

A first current sensor 10A1 and a second current sensor 10A2 are provided to measure the amplitudes of the first and second alternating current IAN and IBN between the live line and neutral line (the amplitudes of the first and second current will be referred to as the first and second current for the sake of briefness). Similarly, a first voltage sensor 10V1 and a second voltage sensor 10V2 are provided to measure the first and second voltage $U_{AN}$ and $U_{BN}$ between the live line and neutral line (the amplitudes of the first and second voltage will be referred to as the first and second voltages for the sake of briefness). The first and second voltage $U_{AN}$ and $U_{BN}$ are the low voltages described above. Additionally, a third voltage sensor 10V3 is provided to measure the voltage $U_{SAB}$ between the live line and live line. The voltage $U_{SAB}$ is the high voltage described above.

The rotor has three windings U, V, W in a symmetric configuration that are connected with three legs of the inverter 1062 separately. A DC voltage $U_{dc}$ from the DC bus voltage regulator (which is not illustrated FIG. 10) is applied to the inverter 1062 as previously described. The first, second and third voltage sensors 10V1, 10V2 and 10V3 and the first and second current sensors 10A1 and 10A1 are electrically connected with the terminal lines A, B and N. A speed sensor 10S is connected with the rotor to measure the rotation speed of the rotor. The speed sensor 10S can measure the rotating speed of the engine, instead of the rotor, since the rotor and the engine are coaxially connected. The first, second and third voltages, the first and second alternating current and the rotating speed can be real time values measured by the voltage sensors, the current sensors and the speed sensor, for example, real time values measured every millisecond or every second. They can also be the averages or integrals of some real time values measured by the sensors in a period. For example, the sensors measure real time values every second, and the first, second and third voltages, the first and second alternating current and the rotating speed can be the averages or integrals of the measured real time values in every 10 successive seconds. The measured operation data of the apparatus from the current sensors, voltage sensors and speed sensor can be modulated, filtered and then sent to the excitation control device 1070.

The excitation control device 1070 may be programmed to have functional modules such as a calculating element and a determining element to implement the operations illustrated in FIGS. 11A and 11B in accordance with some embodiments. For example, the excitation control device 1070 can be installed with programs for creating the calculating element to enable the calculating element to calculate the desired speed of the engine in accordance with the operation data measured by the sensors. The excitation control device 1070 may be implemented with a logic circuit such as CMOS (Complementary Metal Oxide Semiconductor), ASIC (Application Specific Integrated Circuits), PGA (Programmable Gate Array), FPGA (Field-programmable Gate Array) and so on.

As illustrated in FIG. 11A, when the apparatus operates in the low voltage mode, the first and second load powers $P_{load\ AN}$ and $P_{load\ BN}$ between the live line and the neutral line are calculated using equations 1 and 2 below:

$$P_{load\ AN} = U_{AN} * I_{AN} \quad \text{Equation 1}$$

$$P_{load\ BN} = U_{BN} * I_{BN} \quad \text{Equation 2}$$

Where $U_{AN}$ and $U_{BN}$ are the measured output voltages between the live line and the neutral line. $I_{AN}$ and $I_{BN}$ are the measured alternating current between the live line and the neutral line. Then the total load power $P_{load\ total}$ is calculated using equation 3 below:

$$P_{load\ AN} = P_{load\ AN} + P_{load\ BN} \quad \text{Equation 3}$$

The excitation control device determines a desired rotation speed of the engine using the total load power $P_{load\ total}$ and the pre-defined characteristic curve of the engine. The characteristic curve can be pre-stored in the excitation control device.

As illustrated in FIG. 11B, when the apparatus operates in the high voltage mode, the load power $P_{load}$ is calculated using equation 4 below:

$$P_{load} = U_{SAB} * I_{AN} \quad \text{Equation 4}$$

Where $U_{SAB}$ is the high voltage between the live line and live line. $I_{AN}$ can be replaced with $I_{BN}$ in Equation 4, since $I_{AN}$ and $I_{BN}$ are equal in the high voltage mode. Then the excitation control device determines a desired rotation speed of the engine using the load power $P_{load}$ and the pre-defined characteristic curve of the engine. When the desired rotation speed of the engine is available, the excitation control device can correct the rotation speed of the engine by using the desired rotation speed with a closed loop to optimize fuel consumption in response to load changes.

A slip angle is determined using equations 5 and 6 below:

$$\omega_{slip} = \omega_1 - \omega_r \quad \text{Equation 5}$$

$$\theta_{slip} = \int \omega_{slip} \quad \text{Equation 6}$$

Where $\omega_r$ is the rotation speed of the rotor, and $\omega_1$ is the synchronous speed of the alternator. The excitation control device generates a pulse signal using the slip angle and target voltage of the rotor, and then modulates the frequency and amplitude of the excitation current in the plurality of symmetric phase windings of the rotor with the modulating signal.

The control strategy distinguishes the working mode of the system. The system may operate in a high voltage mode and a low voltage mode. FIG. 11A and FIG. 11B respectively illustrate the flowcharts of the low voltage mode and the high voltage mode. The excitation control device receives a working mode signal from the switch. The working mode signal indicates whether the apparatus is working on the high voltage mode or low voltage mode. One or more voltage sensors measure the amplitudes of the low voltage $U_{AN}$ and $U_{BN}$, the high voltage $U_{SAB}$, One or more current sensors measure the live to neutral current $I_{AN}$ and $I_{BN}$. A speed sensor measures the rotation speed of the rotor. In the low voltage mode as illustrated in FIG. 11A, the excitation control device calculates the total load power with the equation of $P_{load\ total} = U_{AN} * I_{AN} + U_{BN} * I_{BN}$, and determines the desired engine speed according to the total load power Pa w. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* according to the amplitude of the measured low voltage $U_{AN}$ or $U_{BN}$. Then the excitation control device generates a modulating signal according to the target voltage of the rotor Urq* and the slip angle $\theta_{slip}$, and uses the modulating signal to modulate the frequency and the amplitude of the current in the phase windings of the rotor. FIG. 11B illustrates the flowchart of the high voltage mode. The excitation control device calculates the load power with the equation of $P_{load} = U_{SAB} * I_{AN}$. In some embodiments, $I_{BN}$ can be used to replace $I_{AN}$ since $I_{AN}$ and $I_{BN}$ are equal in the high voltage mode. Then the excitation control device obtains the desired engine speed according to the load power $P_{load}$. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* according to the amplitude of the measured high voltage $U_{SAB}$. Then the excitation control device generates a modulating signal according to the target voltage of the rotor Urq* and the slip angle $\theta_{slip}$. The excitation control device uses the modulating signal to modulate the frequency and the amplitude of the current in the phase windings of the rotor.

Figure 12:
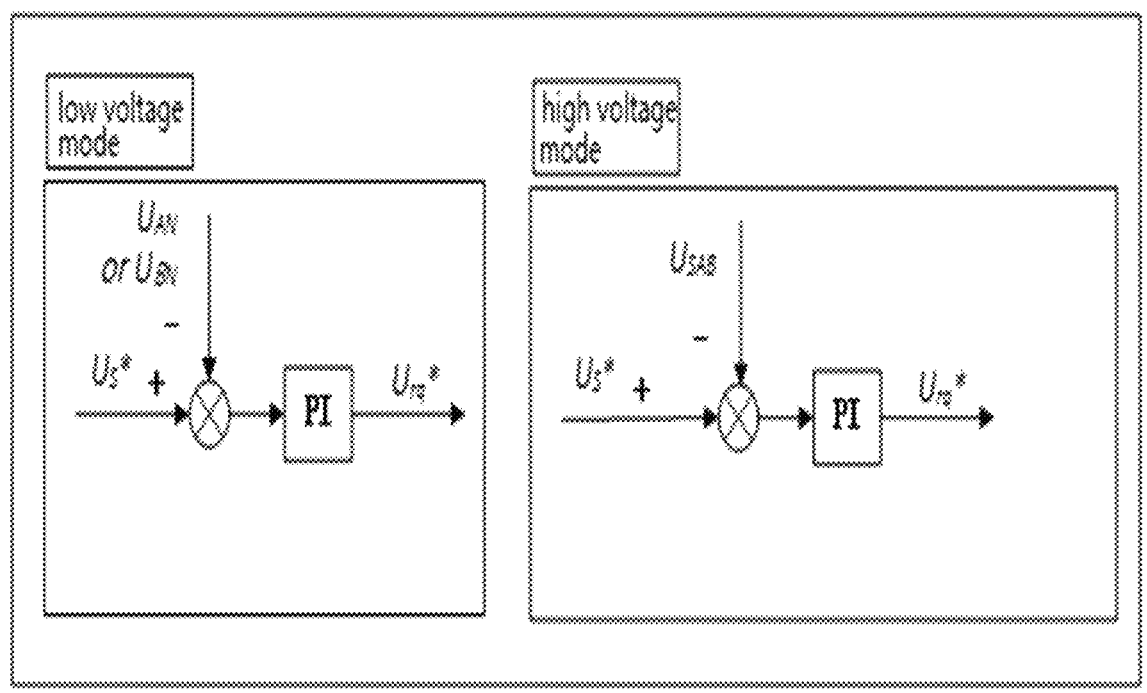
FIG. 12 is schematic diagram of a control loop of the rotor voltage in accordance with some embodiments.

FIG. 12 is schematic diagram of a control loop of the rotor voltage in accordance with some embodiments. A closed loop control is employed in the rotor for automatically modulating the amplitude of the excitation voltage in the low voltage mode and the high voltage mode. A Proportional-Integral (PI) regulator is provided at the closed control loop to reduce errors of the target voltage of the rotor. Specifically, in the high voltage mode, the high voltage $U_{SAB}$, working as a negative feedback, is input into the PI regulator. The target voltage of the stator $U_s^*$ is also input into the PI regulator for correcting the high voltage $U_{SAB}$. The output of the PI regulator is the target voltage of the stator $U_s^*$ may be determined based on the amplitude of the output voltage and features of the power generating apparatus (e.g., the resistance of the rotor and the amplitude of the current in the rotor windings). The output of the PI regulator is also the target voltage of the rotor $U_{rq}^*$ in the low voltage mode. The obtained slip angle $\theta_{slip}$ and target voltage of the rotor $U_{rq}^*$ are used by the excitation control device to generate a pulse signal with a certain duty ratio, which is input into the inverter as illustrated in FIG. 10 to regulate the switch ON and OFF time of the switching elements of the inverter. The inverter regulates the amplitude and frequency of the current in the rotor windings. Thereby the intensity of the rotating magnetic field established in the rotor windings and the rotating speed of the rotating magnetic field relative to the rotor are modulated so that the amplitude and frequency of the induced voltage generated in the stator winding are regulated accordingly.

Figure 13:
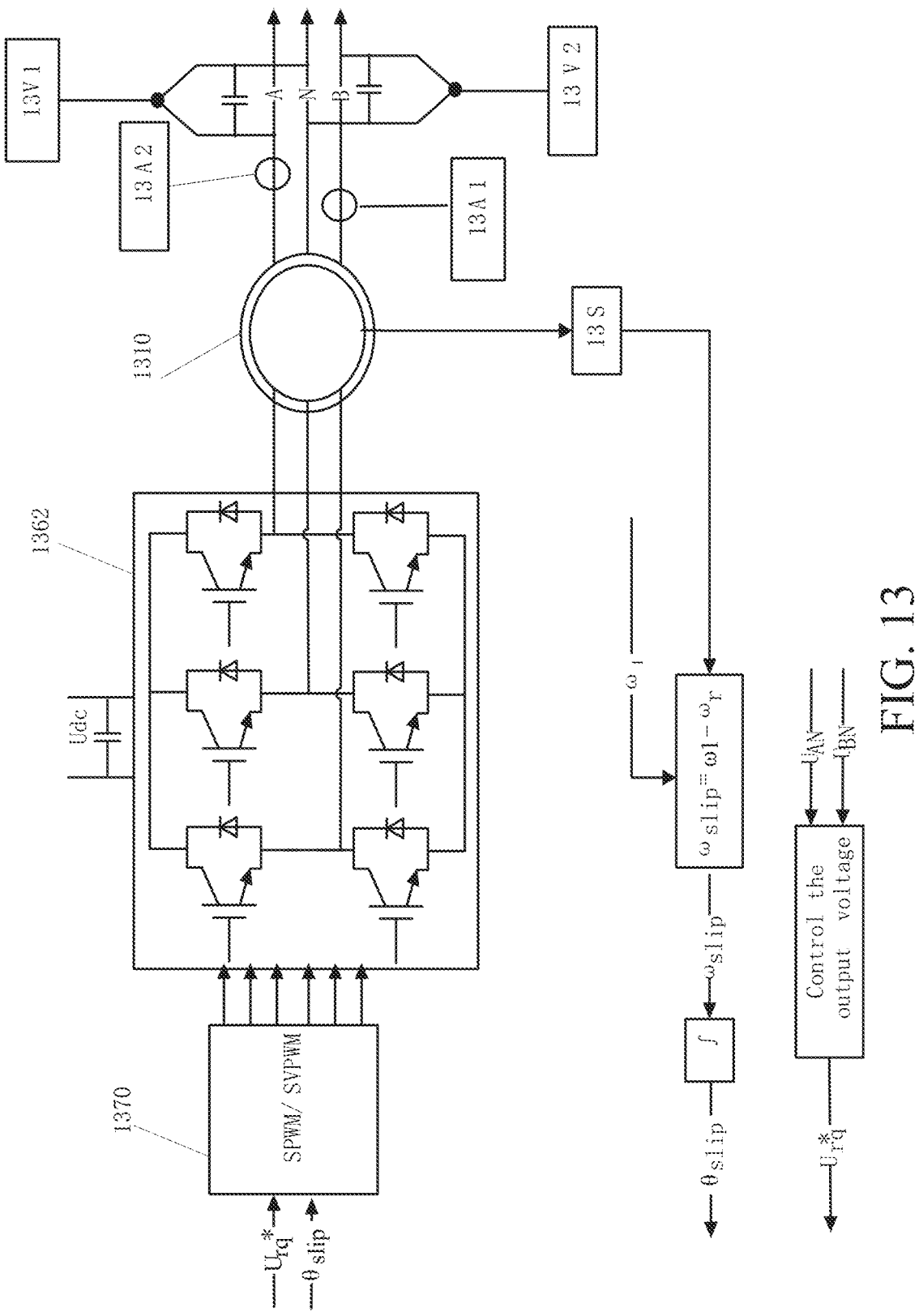
FIG. 13 illustrates another control system for implementing another control strategy in accordance with some embodiments.
Figure 14:
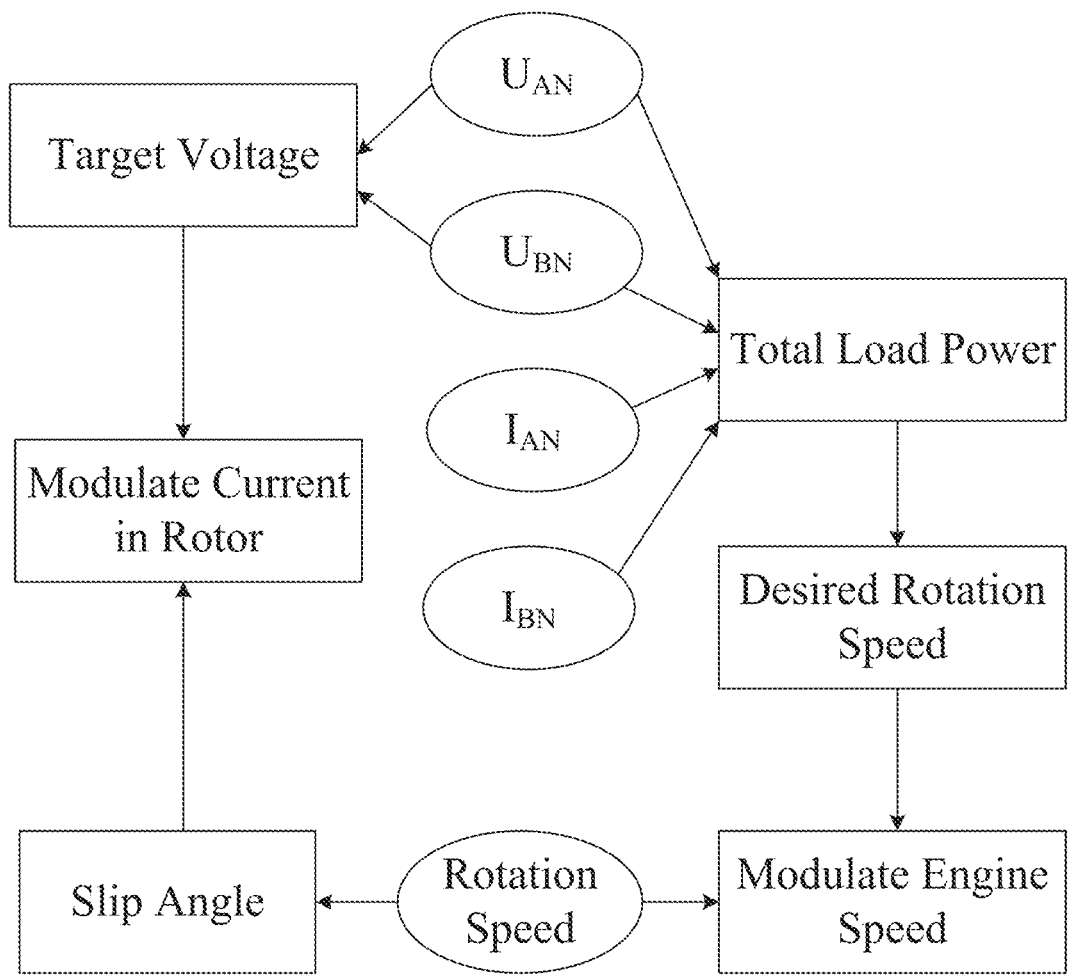
FIG. 14 is a flowchart of another control strategy corresponding to the control system in FIG. 13.
Figure 15:
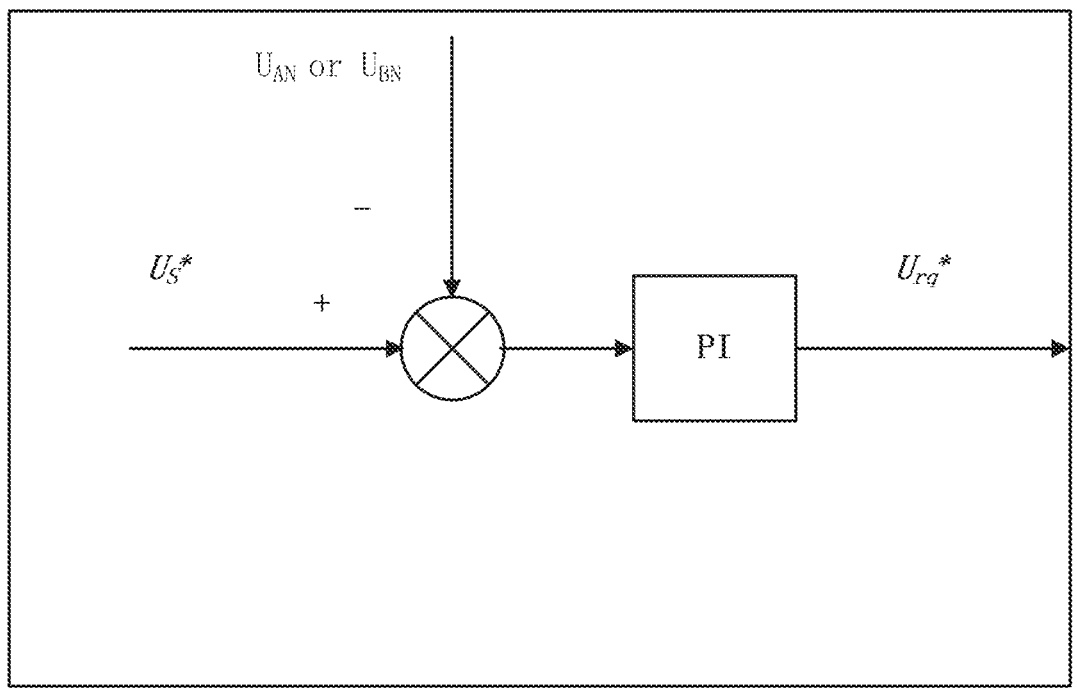
FIG. 15 is schematic diagram of a control loop of the rotor voltage in accordance with some embodiments.

FIG. 13 illustrates another control system for implementing another control strategy in accordance with some embodiments. FIG. 14 is a flowchart of another control strategy corresponding to the control system in FIG. 13. FIG. 15 is schematic diagram of a control loop of the rotor voltage in accordance with some embodiments. As illustrated in FIG. 13, the single phase winding of the stator outputs to the electrical load an output voltage at dual levels, i.e., a high voltage $U_{SAB}$ through live terminal lines A and B and a low voltage $U_{AN}$ and/or $U_{BN}$ through live terminal line A and/or B and neutral terminal line N. Unlike the embodiments illustrated in FIGS. 10-12, the excitation control device employs the same control strategy in these embodiments, no matter whether the apparatus operates in the high voltage mode or the low voltage mode. Thus, switching signals from the switch are not needed for monitoring the apparatus in these embodiments. A first current sensor 13A1 and a second current sensor 13A2 are provided to measure the first live to neutral current $I_{BN}$ and the second live to neutral current $I_{AN}$. Likewise, a first voltage sensor 13V1 and a second voltage sensor 13V2 are provided to measure the first live to neutral voltage $U_{BN}$ and the second live to neutral voltage $U_{AN}$ (i.e., low voltages). The live to live voltage is not needed for implementing the control strategy in these embodiments. A speed sensor 13S is connected with the rotor or the engine to measure the rotation speed of the rotor or the engine.

In accordance with some embodiments, no matter whether the apparatus operates in the high voltage mode or the low voltage mode, the load power of the apparatus is calculated with equation 7 below:

$$P_{load\ total} = U_{AN}^* I_{AN} + U_{BN}^* I_{BN} \qquad \text{Equation 7}$$

Where $U_{AN}$ and $U_{BN}$ are the first and second live to neutral voltages $I_{AN}$ and IBN are the first and second live to neutral current. The excitation device then determines the desired engine speed in accordance with the load power $P_{load\ total}$.

The voltage sensor and the current sensor measure the amplitudes of the live to neutral output voltage $U_{AN}$ and $U_{BN}$ and the load current $I_{AN}$ and $I_{BN}$ in the control strategy illustrated in FIG. 14. The speed sensor measures the rotation speed of the rotor. Then the excitation control device calculates the total load power $P_{load\ total} = U_{AN}^* I_{AN} + U_{BN}^* I_{BN}$, and obtains the desired speed of the engine according to the total load power. The excitation control device (or ECM) modulates the engine speed according to the desired rotation speed of the engine with a close control loop. The excitation control device determines the slip angle $\theta_{slip}$ at least according to the rotation speed of the rotor, and the target voltage of the rotor Urq* at least according to the measured amplitude of the Live to neutral output voltage $U_{AN}$ or $U_{BN}$. Then the excitation control device generates a modulating signal according to the target voltage of the rotor Urq* and the slip angle $\theta_{slip}$, and modulates the frequency and the amplitude of the current in the phase windings of the rotor with the modulating signal.

FIG. 15 is schematic diagram of a control loop of the rotor voltage in accordance with some embodiments. Unlike the embodiments illustrated in FIGS. 10-12, the control loop in the embodiments does not switch over between the high voltage mode and the low voltage mode. Rather, the control loop just employs the low voltage $U_{AN}$ or $U_{BN}$ as a negative feedback input to the PI regulator corresponding to the control system illustrated in FIG. 13. The target voltage of the stator $U_s^*$ also serves as an input of the PI regulator. The output of the PI regulator is the target voltage of the rotor $U_{rq}^*$. The obtained slip angle and target voltage of the rotor are used by the excitation control device to generate a pulse signal with a certain duty ratio, which is input into the inverter to regulate the switch ON and OFF time of the switching elements of the inverter.

The inverter modulates the amplitude and frequency of the current in the rotor windings. Thereby the intensity of the rotating magnetic field established in the rotor windings and the rotating speed of the rotating magnetic field relative to the rotor are regulated so that the amplitude and frequency of the induced voltage generated in the stator winding are regulated accordingly. Only the low voltage (i.e., the live to neutral voltage of the stator) is monitored in the embodiments illustrated in FIGS. 13-15 and the excitation control device does not need to communicate with the switch to obtain its operating mode. It should be noted that the operations illustrated in FIGS. 11A and 11B and 14 can be implemented in an order different from the order illustrated in these figures. Some operations can be conducted substantially simultaneously or in a reverse order, depending on the functions achieved by the operations. For example, the operation of determining the target voltage of the rotor can be conducted after or at the same time as the operation of measuring the rotating speed of the rotor is implemented.

The various embodiments disclosed above have many advantages. A plurality of coils that are separately connected with a switch are employed in the off-grid power generating apparatus to provide a dual level voltage. The cost of the apparatus is very low. The apparatus has a stator with a single winding and a rotor with a plurality of symmetric windings. The combination of a stator with a single winding and a rotor with a plurality of symmetric phase windings enables the apparatus to power single phase electrical devices with small rated powers such as household appliances while keeping the control system of the apparatus simple and easy to implement.

A meter for measuring the angular position of the rotor such as an encoder, which is typically expensive, is not used in the control system in accordance with some embodiments. Further, a current control loop, which is usually involved in vector control methods, is not used in the system. The control system is therefore simple and easy to implement. As a result, an excitation control device with a low capability can be used in the apparatus.

The power generating apparatus outputs electrical power directly from the stator without any frequency conversion in accordance with some embodiments. Unlike a generator with an AC-DC-AC converter regulating the full power (overall power) of the generator, the apparatus merely modulates a fraction of its full power with an inverter. The inverter modulates the amplitude and frequency of the current in the rotor windings to offset variations of the induced voltage that is generated in the stator winding. In this manner, the amplitude and frequency of the output voltage from the stator, i.e., the output voltage of the apparatus, are kept stable. It is estimated that the rated power of a power converter disposed on the rotor side of a power generating apparatus accounts for merely around 10% of the rated output power of the power generating apparatus. Thus, an inverter with a lower rated capacity can be used in the apparatus. The inverter applies an AC voltage to the phase windings of the rotor as an excitation voltage for establishing the rotating magnetic field in the rotor. Both the amplitude of the excitation voltage and its frequency are controllable. This is advantageous given that only the amplitude of the excitation voltage is controllable when a DC voltage is used as the excitation voltage.

The operation speed of the engine in the apparatus is desirably adjustable to maximize fuel efficiency, and thus reduces $CO_2$ emissions of the engine for a given load. Optimizing the operating speed of the engine corresponding to a given load also reduces the noise associated with operation of the engine-driven apparatus and extends the life of the engine. The output voltage from the stator is substantially kept at a constant frequency.

The amplitude of the output voltage provided by the apparatus is stable given that a closed voltage loop is employed to determine the target rotor voltage for regulating the intensity of the rotating magnetic field. With this feature, the apparatus can be utilized to power electrical devices such as audio and video players and some scientific instruments that are sensitive to voltage and frequency instability. Furthermore, the apparatus can provide an output voltage at dual levels with a single phase winding so that users can use the apparatus to power electrical devices with different nominal voltages.

The apparatus is set to operate at a speed equal to or less than the synchronous speed of the alternator, which means that electrical energy flows uni-directionally, i.e., from the stator to the rotor, not vice visa. This feature renders cheap devices such as uncontrolled bridge rectifier applicable to the apparatus. The feature also makes it possible to control the apparatus with a simple and easy control strategy. Devices with a comparatively low capability can also be used in the apparatus.

The above is only the preferred embodiments of the application and not intended to limit the application, and any modifications, equivalent replacements, improvements and the like within the spirit and principle of the application shall fall within the scope of protection of the application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. An off-grid power generating apparatus comprising:
   an engine;
   an alternator including:
   a rotor coaxially coupled to the engine, the rotor including a plurality of symmetric phase windings,
   a switch operatively connected with the electrical load, the switch being movable between a first position and a second position by a user;
   a stator with a single phase winding that includes an output portion, wherein the output portion has a first segment and a second segment each of which has at least one coil configured to generate an induced voltage, the first segment and the second segment are operatively and separately connected with the switch, the first segment and the second segment are configured to be connected in series at the first position of the switch to provide a high voltage to the electrical load via the switch, and connected in parallel at the second position of the switch to provide a low voltage to the electrical load via the switch; and one or more sensors configured to measure operation data of the apparatus; and
   an excitation control device operatively connected to the engine and the alternator, wherein the excitation control device is configured to:
   control the induced voltage generated in the single phase winding of the stator by regulating a rotating magnetic field generated in the phase windings of the rotor;
   calculate load powder of the electrical load at least in accordance with the operation data measured by the one or more sensors; and
   regulate speed of the engine in response to the calculated load powder;
   wherein the alternator further comprising a frequency conversion device operatively connected with the single phase winding of the stator, wherein the frequency conversion device is operatively connected with the phase windings of the rotor and supplies an excitation voltage to the phase windings of the rotor for establishing the rotating magnetic field;

wherein the frequency conversion device comprises:
a direct current bus voltage regulator operatively connected with the single phase winding of the stator, the direct current bus voltage regulator being configured to receive and rectify the excitation voltage from the single phase winding of the stator, and output a rectified direct current bus voltage; and
an inverter operatively connected with the direct current bus voltage regulator, the inverter being configured to receive the rectified direct current voltage, and supply an alternating current voltage to the plurality of symmetric phase windings of the rotor for establishing the rotating magnetic field.

2. The apparatus of claim 1, wherein the alternator is set to operate at a speed equal to or less than a synchronous speed of the alternator.

3. The apparatus of claim 1, wherein either of the first segment and the second segment is operatively connected with the frequency conversion device and applies the excitation voltage to the phase windings of the rotor via the frequency conversion device.

4. The apparatus of claim 1, wherein the single phase winding of the stator includes an excitation portion with at least one coil, the excitation portion being connected with the frequency conversion device and applying the excitation voltage to the phase windings of the rotor via the frequency conversion device.

5. The apparatus of claim 1, the alternator further comprising an electrical circuit connecting the single phase winding of the stator and the electrical load and configured in a way that the induced voltage generated in the single phase winding of the stator and the output voltage provided to the electrical load are at the same frequency.

6. The apparatus of claim 1, the alternator further comprising a signal transmitter between the switch and the excitation control device for transmitting a signal indicating the voltage mode of the switch to the excitation control device.

7. The apparatus of claim 1, wherein either of the first segment and the second segment is configured to be connected with the electrical load via the switch and applies to the electrical load with the low voltage when the first segment and the second segment are connected in series.

8. An off-grid portable generator set comprising:
an engine; and
an induction asynchronous alternator including:
a rotor driven by the engine, the rotor including a plurality of symmetric phase windings;
a switch operatively connected with the electrical load, the switch being movable between a first position and a second position by a user;
a stator with a single phase winding that includes an output portion, wherein the output portion has a first segment and a second segment each of which has at least one coil for generating an induced voltage, the first segment and the second segment are operatively and separately connected with the switch, the first segment and the second segment are configured to be connected in series at the first position of the switch to provide a high voltage to the electrical load, and connected in parallel at the second position of the switch to provide a low-voltage to the electrical load; and one or more sensors configured to measure operation data of the apparatus, and
an excitation control device operatively connected to the engine and the alternator, wherein the excitation control device is configured to:
control the induced voltage generated in the single phase winding of the stator by regulating a rotating magnetic field generated in the phase windings of the rotor;
calculate load power of the electrical load at least In accordance with the operation data measured by the one or more sensors: and
regulate speed of the engine in response to the calculated load power;
wherein the alternator further comprising a frequency conversion device operatively connected with the single phase winding of the stator, wherein the frequency conversion device is operatively connected with the phase windings of the rotor and supplies an excitation voltage to the phase windings of the rotor for establishing the rotating magnetic field;
wherein the frequency conversion device comprises:
a direct current bus voltage regulator operatively connected with the single phase winding of the stator, the direct current bus voltage regulator being configured to receive and rectify the excitation voltage from the single phase winding of the stator, and output a rectified direct current bus voltage; and
an inverter operatively connected with the direct current bus voltage regulator, the inverter being configured to receive the rectified direct current voltage, and supply an alternating current voltage to the plurality of symmetric phase windings of the rotor for establishing the rotating magnetic field.

9. The generator set of claim 8, wherein the alternator is set to operate at a speed equal to or less than a synchronous speed of the alternator.

10. The generator set of claim 8, wherein either of the first segment and the second segment is operatively connected with the frequency conversion device and applies the excitation voltage to the phase windings of the rotor via the frequency conversion device.

11. The generator set of claim 8, wherein the single phase winding of the stator includes an excitation portion with at least one coil, the excitation portion being connected with the frequency conversion device and applying the excitation voltage to the phase windings of the rotor via the frequency conversion device.

12. The generator set of claim 8, the alternator further comprising an electrical circuit connecting the single phase winding of the stator and the electrical load and configured in a way that the induced voltage generated in the single phase winding of the stator and the output voltage provided to the electrical load are at the same frequency.

13. The generator set of claim 8, the alternator further comprising a signal transmitter between the switch and the excitation control device for transmitting a signal indicating the voltage mode of the switch to the excitation control device.

14. The generator set of claim 8, wherein either of the first segment and the second segment is configured to be connected with the electrical load via the switch and supplies to the electrical load with the low voltage when the first segment and the second segment are connected in series.

* * * * *